(12) United States Patent
VanHoose et al.

(10) Patent No.: US 7,430,991 B2
(45) Date of Patent: Oct. 7, 2008

(54) METHOD OF AND APPARATUS FOR HYDROGEN ENHANCED DIESEL ENGINE PERFORMANCE

(76) Inventors: Tom M. VanHoose, 3242 Burley Hill Rd., Highwood, MT (US) 59450; Michael D. Goens, 338 Alta, Girdwood, AK (US) 99587

( * ) Notice: Subject to any disclaimer, the term of this patent is extended or adjusted under 35 U.S.C. 154(b) by 0 days.

(21) Appl. No.: 11/800,388

(22) Filed: May 4, 2007

(65) Prior Publication Data
US 2008/0017137 A1    Jan. 24, 2008

Related U.S. Application Data

(60) Provisional application No. 60/797,468, filed on May 4, 2006.

(51) Int. Cl.
*F02B 43/00* (2006.01)
(52) U.S. Cl. ............... 123/3; 123/198 D; 123/DIG. 12
(58) Field of Classification Search ............... 123/1 A, 123/3, 198 D, DIG. 12
See application file for complete search history.

(56) References Cited

U.S. PATENT DOCUMENTS

| | | | |
|---|---|---|---|
| 4,271,793 A | 6/1981 | Valdespino | |
| 4,369,737 A | 1/1983 | Sanders et al. | |
| 5,231,954 A | 8/1993 | Stowe | |
| 5,546,902 A | 8/1996 | Paluch et al. | |
| 5,733,421 A | 3/1998 | Pettigrew et al. | |
| 6,311,648 B1 | 11/2001 | Larocque | |
| 6,386,246 B2 | 5/2002 | Pope et al. | |
| 6,866,756 B2 | 3/2005 | Klein | |
| 6,896,789 B2 | 5/2005 | Ross | |
| 2003/0024489 A1* | 2/2003 | Balan et al. | 123/3 |
| 2005/0126515 A1 | 6/2005 | Balan et al. | |

OTHER PUBLICATIONS

"General Engine Specs" [online] Feb. 14, 2006 [retrieved on Sep. 18, 2007], retrieved from the internet <URL> http://http://web.archive.org/web/20060214093616/http://adieselengine.com/general_engine_specs.htm>, 3 pages.
Young, Lee W., International Search Report for International Search Report for International Application PCT/US07/10834 as mailed Jul. 1, 2008 (4 pages).

* cited by examiner

*Primary Examiner*—Noah Kamen
(74) *Attorney, Agent, or Firm*—Winstead PC

(57) ABSTRACT

A system includes an electrolysis unit capable of producing hydrogen and oxygen gases and interoperably connected to a diesel engine. The amount of amount of hydrogen and oxygen gases produced by the electrolysis unit is proportionally correlated to the stroke type and stroke displacement of the diesel engine. The system also includes a power supply system that is interoperably connected to the electrolysis unit. The power supplied by the power supply system is proportional to an amount of hydrogen and oxygen to be supplied to the diesel engine. The system also includes a safety mechanism interoperably connected to the power supply system so as to terminate power to the electrolysis unit in response to cessation of operation of the diesel engine.

22 Claims, 22 Drawing Sheets

METHOD OF AND APPARATUS FOR HYDROGEN ENHANCED DIESEL ENGINE PERFORMANCE

CROSS-REFERENCE TO RELATED APPLICATIONS

This application claims the priority benefit under 35 USC §119(e) to, and incorporates by reference the entire disclosure of, Provisional Patent Application No. 60/797468, filed May 4, 2006.

BACKGROUND

1. Field of Invention

The invention relates to a method and apparatus for hydrogen-enhanced performance of diesel engines through the injection of hydrogen and oxygen and, more particularly, but not way of limitation, to an onboard system adapted to generate oxygen and hydrogen by electrolysis for delivery to a diesel engine.

2. History of Related Art

The generation of hydrogen and oxygen by the way of electrolysis has been known for many decades. Likewise, the combustibility of the combination of gaseous oxygen and hydrogen is known. Through the years, internal combustion engines have been the subject of performance enhancing designs by way of injecting additives to the engine to improve efficiency. One such way is to inject hydrogen and oxygen into the feed of an engine. For example, U.S. Pat. No. 5,733,421, which teaches a hydrogen-oxygen fuel cell, describes the major problems in the operation of convention fossil fueled vehicles and details the advantages of utilizing the electrolysis products in engines. Much attention has been placed on gasoline engines operating under the "Otto cycle", which uses a spark to ignite a compressed fuel.

Diesel engines are also in widespread use. They operate under the "Diesel cycle", which relies on shear compression and latent heat of the engine block to ignite the compressed fuels. Not the least of the problems associated with the diesel engine are the emissions produced by the diesel oil combustion due to incomplete combustion in the engine cylinder. This is, indeed, a predominant issue in the utilization of the conventional diesel engine. Since the diesel engine is a compression-based ignition system, various parameters of the engine performance differ from that of the gasoline engine. The Diesel cycle does not require spark plugs as compared to the Otto cycle. This difference in combustion ignition subsequently results in markedly different performance characteristics as well as the resultant products of combustion. Byproducts of combustion engines have become a major focal point for both gasoline and diesel engines. Many performance enhancement systems and methods have received careful review, including electrolysis unit product enrichment.

Among the disadvantages of diesel engines is the discharge of pollutants due to poor combustion efficiency. The reasons for such pollution vary; however, one issue is the burning rate of the diesel fuel within the engine cylinders. Often the diesel fuel mixtures are exhausted through the exhaust manifold while still burning. This is the result of incomplete combustion in the cylinders. The discharge of under combusted hydrocarbons and other byproducts can be hazardous to the health of exposed populations as well as the overall environment.

It has been found that the introduction of hydrogen and oxygen of the type generated by an electrolysis unit can enhance the performance of internal combustion engines. For this reason, numerous designs address the introduction of hydrogen and oxygen gases into an internal combustion engine prior to ignition. U.S. Pat. No. 5,733,421 describes some of these designs and steps taken to address many problems associated with such systems.

There are multiple concerns when designing electrolysis units for onboard service near an internal combustion engine. Safety, reliability, required maintenance, hydrogen volume and the like have generally been key to commercial acceptance of such systems. Unfortunately, these same factors have limited various design aspects with regard to creating a reliable onboard system for internal combustion engines such as diesel engines. It is well known, as set forth above, that the combustion cycle of diesel engine varies from that of an internal combustion gasoline engine. For example, spark plugs are not used in diesel engines and are instead replaced by glow plugs. The glow plugs are electrically charged to heat the initial gases compressed in a "cold" cylinder of a diesel engine to the point of ignition and are subsequently deactivated to allow the natural heat of the engine block and the pressure of compression of the air fuel mixture within the diesel system to provide the requisite combustion in accordance with established diesel cycle technology.

With a gasoline engine, most the products of hydrolysis are fully combustible and may be combusted in place of fuel. This is true of "Otto cycle" internal combustion engines where it is difficult to put too much pure hydrogen-oxygen "the products of electrolysis" into the internal combustion engine. The hydrogen-oxygen gas basically replaces the fuel oxygen mixture and the performance is maintained. However, to produce a sufficient supply of oxygen and hydrogen through electrolysis to run an Otto cycle engine is quite difficult with a relatively small electrolysis unit. The volume of hydrogen-oxygen gas that would be consumed in a conventional Otto cycle engine of the type utilized in automobiles today would require a much larger electrolysis unit than described herein. In a diesel engine, if too much oxygen and hydrogen is injected into the engine, the free oxygen needed for combustion would be displaced. Any excess oxygen and hydrogen is not a solution in a diesel cycle engine unless the quantities are controlled and optimized for diesel engine enhancement.

SUMMARY OF THE INVENTION

A system includes an electrolysis unit capable of producing hydrogen and oxygen gases and interoperably connected to a diesel engine. The amount of amount of hydrogen and oxygen gases produced by the electrolysis unit is proportionally correlated to the stroke type and stroke displacement of the diesel engine. The system also includes a power supply system that is interoperably connected to the electrolysis unit. The power supplied by the power supply system is proportional to an amount of hydrogen and oxygen to be supplied to the diesel engine. The system also includes a safety mechanism interoperably connected to the power supply system so as to terminate power to the electrolysis unit in response to cessation of operation of the diesel engine.

A method includes a step of providing power to an electrolysis unit. The power provided is proportional to an amount of hydrogen gas and oxygen gas to be produced by the electrolysis unit. The method also includes the step of producing, by the electrolysis unit, hydrogen gas and oxygen gas. The method also includes the step of transmitting at least some of the produced hydrogen gas and oxygen gas to a diesel engine. The method also includes the step of obtaining information regarding the transmitted hydrogen gas and oxygen gas. The method also includes the step of determining, based on the obtained information, whether the amount of power provided to the electrolysis unit should be adjusted.

The summary of the invention is not intended to represent each embodiment or every aspect of the invention.

BRIEF DESCRIPTION OF THE DRAWINGS

A more complete understanding of the method and apparatus of the invention may be obtained by reference to the following Detailed Description when taken in conjunction with the accompanying Drawings wherein.

DETAILED DESCRIPTION OF ILLUSTRATIVE EMBODIMENTS OF THE INVENTION

Figure 1:
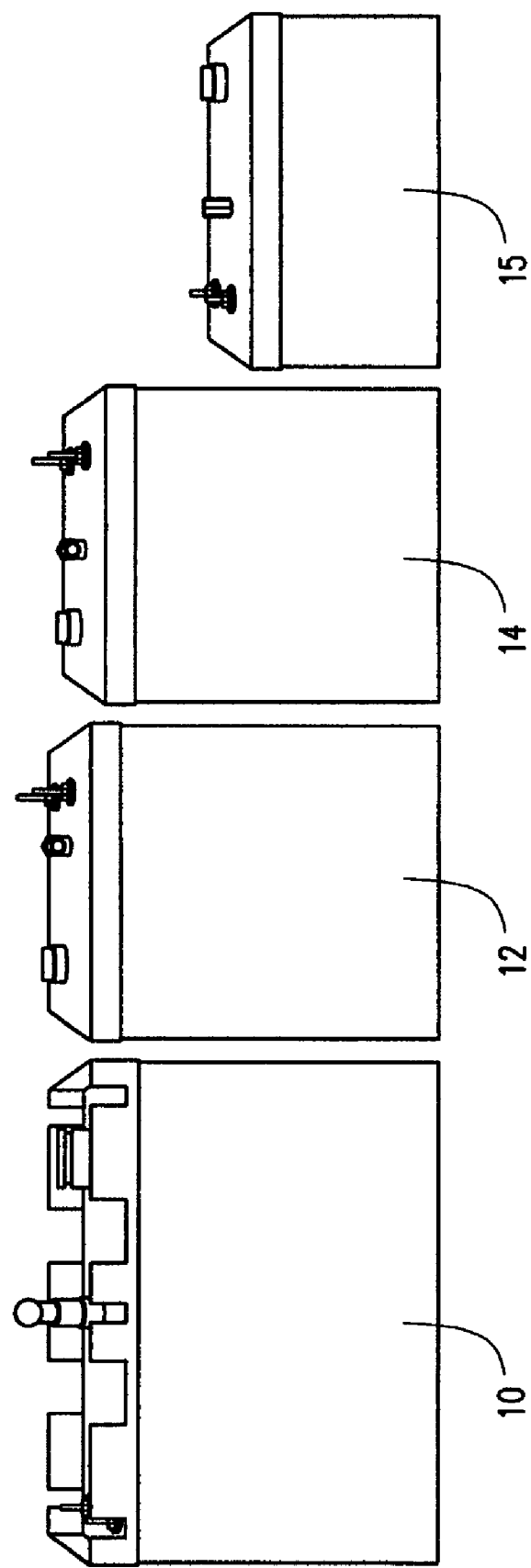
FIG. 1 is an illustration of one embodiment of a an electrolysis unit.

Various embodiment(s) of the invention will now be described more fully with reference to the accompanying Drawings. The invention may, however, be embodied in many different forms and should not be construed as limited to the embodiment(s) set forth herein. The invention should only be considered limited by the claims as they now exist and the equivalents thereof.

It would be an advantage to provide a safe and reliable in operation for delivering select quantities of hydrogen and oxygen gases from an onboard electrolysis unit in a manner affording increased engine performance and reduction of hydrocarbon emission in a diesel engine. Embodiments of the invention as described provide such a system by generating hydrogen and oxygen through an electrolysis unit particularly adapted for onboard applications in conjunction with internal combustion of diesel engines.

It would be an advantage to make such a system virtually maintenance-free and cost-effective to encourage use by an operator and owner of equipment employing an onboard diesel engine that can improve in performance by use of hydrogen and oxygen feed supplementation.

It would be an advantage to offer a system that is optimized to particular types of diesel engines. It would also be an advantage to offer a system where operational optimization could occur based upon inlet or outlet characterization, flows, temperatures, and engine operational status.

Referring now to the Figures, it is shown how in various embodiments of the invention of an electrolysis unit may be utilized in an onboard mounted configuration to enhance the performance of a diesel engine. In certain embodiments, it can be predetermined what the necessary oxygen and hydrogen gas feed rate is to improve the performance of a diesel engine of a given size. Various embodiments of the invention provide for such a determination of the volume of an electrolysis unit to allow the creation and discharge of hydrogen and oxygen from the electrolysis unit at a volumetric level that matches the operation of the engine.

Various embodiments of the invention relate to methods of and systems for improving diesel engine performance by utilizing hydrogen and oxygen produced by an electrolysis unit to enrich the fuel feed to a diesel engine. More particularly, various embodiments of the invention relate to a method of generating oxygen and hydrogen through electrolysis within an electrolysis unit adapted for onboard vehicle mounting in conjunction with a diesel engine. Various embodiments include an electrolysis unit that is a self-contained, sealed unit adapted for pressurization and reliable on/off operation at pre-selected voltages for generating a pre-determined quantity of both hydrogen and oxygen gas for feeding into the combustion chamber of an associated diesel engine.

Various embodiments of the invention also relate to methods of controlling the output from the electrolysis unit to the inlet of the engine. In some embodiments, the amount of hydrogen and oxygen gas produced by the electrolysis unit is correlated to the size and type of a diesel engine. In some embodiments, the amount of hydrogen and oxygen gas produced from the electrolysis unit is correlated to the stroke type, specifically "short" or "long". In some embodiments, the amount of hydrogen and oxygen gas produced from the electrolysis unit is correlated to the stroke displacement of the engine. In some embodiments, the electrolysis unit output corresponds to the amount of voltage sent to the electrolysis unit by a variable voltage control unit. In some embodiments, the electrolysis unit output is correlated to the temperature of the electrolysis unit. In some embodiments, the temperature of the electrolysis unit is controlled using a thermal wrapping. In some embodiments, the temperature of the cell is used to "feed back" information to the variable voltage control unit to control gas output from the electrolysis unit. In some embodiments, information regarding the flow rate of gas from the output of the electrolysis unit is fed back to the variable voltage control unit to control gas output from the electrolysis unit. In some embodiments, information regarding the hydrogen or oxygen composition from the output of the electrolysis unit is fed back to the variable voltage control unit to control gas output from the electrolysis unit. In some embodiments, information regarding hydrocarbon composition in the exhaust gas from the diesel engine is fed back to the variable voltage control unit to control gas output from the electrolysis unit.

Various embodiments of the invention also relate to an electrolysis unit powered and controlled by the electrical systems of a diesel engine. Various embodiments of the invention also relate to the automatic disabling of the electrical system used to transmit power to the electrolysis unit by opening the circuit when the engine is not operational. In this way the flammable products of electrolysis—hydrogen and oxygen gas—are not allowed to be generated when the engine is not running. For the safety of the operator, onboard electrolysis should cease upon termination of engine operation so to avoid excess flammable hydrogen gas from being produced and put into a hot, enclosed environment with available oxygen. In one embodiment, a solenoid is directly connected to a select portion of the engine alternator. In this embodiment, the termination of engine terminates the discharge of electricity from the alternator—a "fail safe" solenoid response to the engine stopping. In this embodiment, the solenoid is connected "in line" with the electrical system of the engine—voltage is provided to the cell(s) of the electrolysis unit only when the engine is operating. In another embodiment, an oil pressure sensor is used to ascertain a minimum operating oil pressure (indicating the engine is running) before closing the circuit and supplying energy to the electrolysis unit. Upon loss of oil pressure, a circuit is opened by the same sensor. In another embodiment, a solenoid supplies power to a thermal blanket used to heat the cells and encourage electrolysis, and thereby hydrogen and oxygen gas production, so that heat is only supplied when the alternator is active. As can be seen, a number of variations can be devised to ensure that production of hydrogen and oxygen only occurs when the diesel engine is in operation.

Various embodiments of the invention also relate to a system for providing electrolysis for a diesel engine in an onboard mounted configuration. A system includes a modular electrolysis unit design affording select mounting of electrolysis plates within a pre-defined quantity of electrolysis cells designed to generate a determined amount of hydrogen and oxygen gas for injection into the diesel engine based upon known operational characteristics of the diesel engine system. In one embodiment, a range of five to nine plates is provided in each cell of the electrolysis unit, wherein the number of cells is modifiable given the characteristics of the diesel engine system. In another embodiment, an increase in combustible liters of engine stroke displacement will be met with an increase in a proportional manner by an increase in size of the onboard electrolysis unit to provide an optimal amount of hydrogen and oxygen gas to the air inlet of the diesel engine system. In another embodiment, the type of engine stroke will determine an appropriate amount of hydrogen and oxygen gas to produce.

Various embodiments of the invention also relate to an electrolysis unit configuration with an internal electrical network that provides the separation of positive and negative power nodes on opposite ends of individual electrolysis cells. In such embodiments, the contiguous chambers allows "reverse polarity" so as to eliminate known problems that may occur between separate electrolysis cells housed in the same electrolysis unit.

The voltage in some embodiments may be varied across the plates of an electrolysis unit to effect different cell output production rates in relation to the phase of operation of the engine. In other embodiments, the temperature of the electrolysis unit may be manipulated to increase or decrease gas production during certain operations. In some embodiments, the voltage or temperature may be varied between two different stages: 1) start up and 2) ongoing engine operations. In the startup phase, one skilled in the art would assume that the engine is at an ambient temperature and that the electrolysis unit is likewise quiescent. The generation of hydrogen and oxygen at that point is, in accordance with principles of the invention, increased from such a state by either additional voltage or increased temperature, or both. During the second stage, the goal of gas production would typically be to maintain a steady flow at an optimal performance level.

Various embodiments of the invention also relates to the application of an internal combustion engine operating on the diesel cycle. The products of electrolysis are provided in a configuration that improves performance rather than replacing the normal fuel to the engine. For example, it has been found that for short stroke diesel engines, the average amount of gas production from a electrolysis unit should be about 0.06 L/minute of hydrogen per liter of stroke displacement. In another example, it has been determined that for long stroke diesel engines, the amount of gas production should be about 0.11 L/minute of hydrogen per liter of stroke displacement. Enriching the inlet gas with too much hydrogen and oxygen will result in the system becoming oxygen-depleted due to hydrogen using up more inlet oxygen that desired. Using too little hydrogen and oxygen causes the full benefit of enriching the system to be under-exploited. The range of variation in the amount of hydrogen or oxygen to feed the diesel engine will typically vary by about ±10%. For the purposes of this patent application, the term "about" means ±10% of the stated value.

Those having skill in the art will appreciate that an electrolysis unit such as that illustrated and described in this application is not the only way that an appropriate amount of hydrogen or oxygen gases can be transmitted to a diesel engine for combustion. Other sources of hydrogen or oxygen may be utilized without departing from principles of the invention. For example, separate tanks containing hydrogen and oxygen gases may be fed into a diesel engine. Another example is that each component is generated separately using a different mechanism. For example, hydrogen gas may be generated using a system that strips hydrogen catalytically from a hydrocarbon feed source. In another example, oxygen gas may be generated as a product of a thermal decomposition reaction, such as by decomposing potassium chlorate or sodium chlorate. Other mechanisms for providing free hydrogen and oxygen gases for later feed to the air inlet of a diesel engine could be employed.

Referring now to FIG. 1, there are shown several embodiments of electrolysis units. FIG. 1 shows electrolysis units in four different sizes from left to right: a three-cell unit 10, a two-cell unit 12, a one-cell unit 14, and a half-cell unit 15. The size of each electrolysis unit is determined in part according to the operational requirements for the diesel engine system based upon the necessary volume of hydrogen and oxygen gas needed.

Figure 1A:
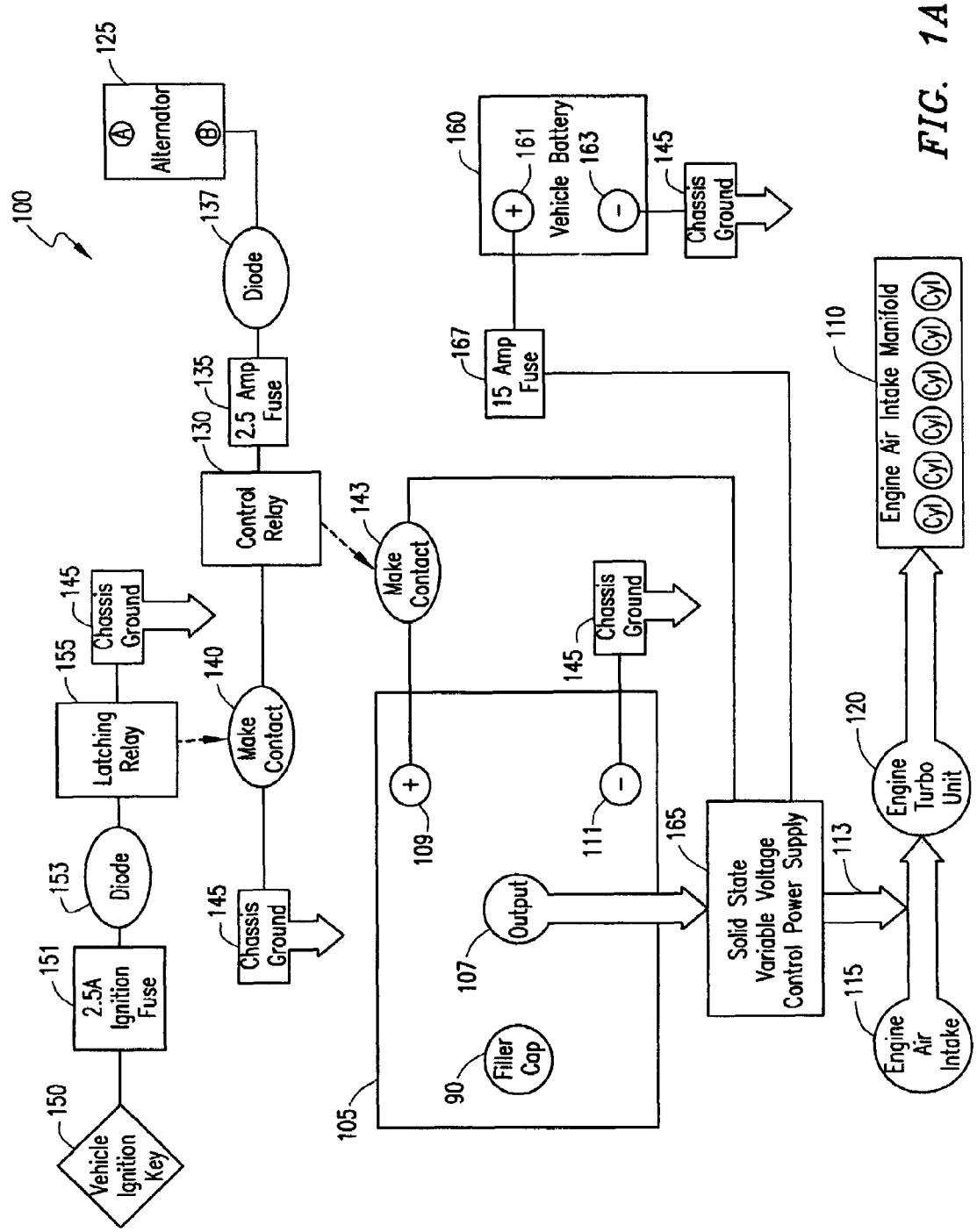
FIG. 1A is a schematic illustrating operation of an electrolysis unit of FIG. 1 in association with an internal combustion engine.

Referring now to FIG. 1A, there is shown an operational schematic of a system 100. It may be seen that the gases produced by electrolysis from an electrolysis unit 105 are injected from an output 107 into an engine air intake manifold of an internal combustion engine 110 between an engine air intake 115 (e.g., an air filter) and an engine turbo unit 120 (or other gas compressor) via a hose 113. Most high-efficiency diesel engines include a turbine, which at its inlet during operation creates an area of relative low pressure (versus ambient conditions) as gases accelerate into the compressor. This area of low pressure acts as a driver that may be utilized to also receive the products emitted from the electrolysis unit in accordance with principles of the invention.

Still referring to the system 100 of FIG. 1A, the electrolysis unit 105 is connected to an electrical system of the internal combustion engine 110. The electrolysis unit 105 is connected to an alternator 125 for use both as a power supply during engine operation as well as a safety "kill switch" when the engine stops operating. The alternator 125 includes an "A" post and a "B" post. The B post of the alternator 125 is utilized in this example to connect to a control relay 130 (e.g., a solenoid). In this setup, if the alternator 125 is not in operation, energy is not provided for actuation of the control relay 130, thereby inhibiting any power flow to the electrolysis unit 105. The inability to establish current flow is an example of a safety feature because when there is no current flowing, the electrolysis unit 105 cannot operate and feed hydrogen and oxygen gases to the diesel engine. When the engine is not rotating, such as when the engine is shut off, the alternator 125 does not produce current and the control relay 130 opens, thereby disengaging the electrolysis unit 105 from the electrical system of the engine and preventing further production of product gases. In the embodiment in FIG. 1A, an input of the control relay 130 is connected to the alternator 125 through a 2.5 amp fuse 135 and a diode 137. An output of the control relay 130 is connected to a "make" contact 140 associated with a latching relay 155 having a connection to a chassis ground 145.

Still referring to the embodiment described in FIG. 1A, the system 100 further includes a vehicle ignition key switch 150 connected to a latching relay 155 through a 2.5 amp switched fuse 151 and a blocking diode 153. The latching relay 155 is further connected to the chassis ground 145. The electrolysis unit 105 has a negative terminal 111 connected to the chassis ground 145. A positive terminal 109 of the electrolysis unit 105 is connected to a solid state variable voltage control power supply through a make contact 143 associated with the control relay 130. A positive terminal 161 of a vehicle battery 160 is connected to the solid state variable voltage control power supply 165 through a 15 amp fuse 167. A negative terminal 163 of the vehicle battery 160 is connected to the chassis ground 145. The electrolysis unit gas output is monitored by the solid state variable voltage control power supply unit 165 as it passes through hose 113. The electrolysis unit 105 also has a filler cap 90 that allows electrolytic solution to be replenished, if necessary.

Figure 1B:
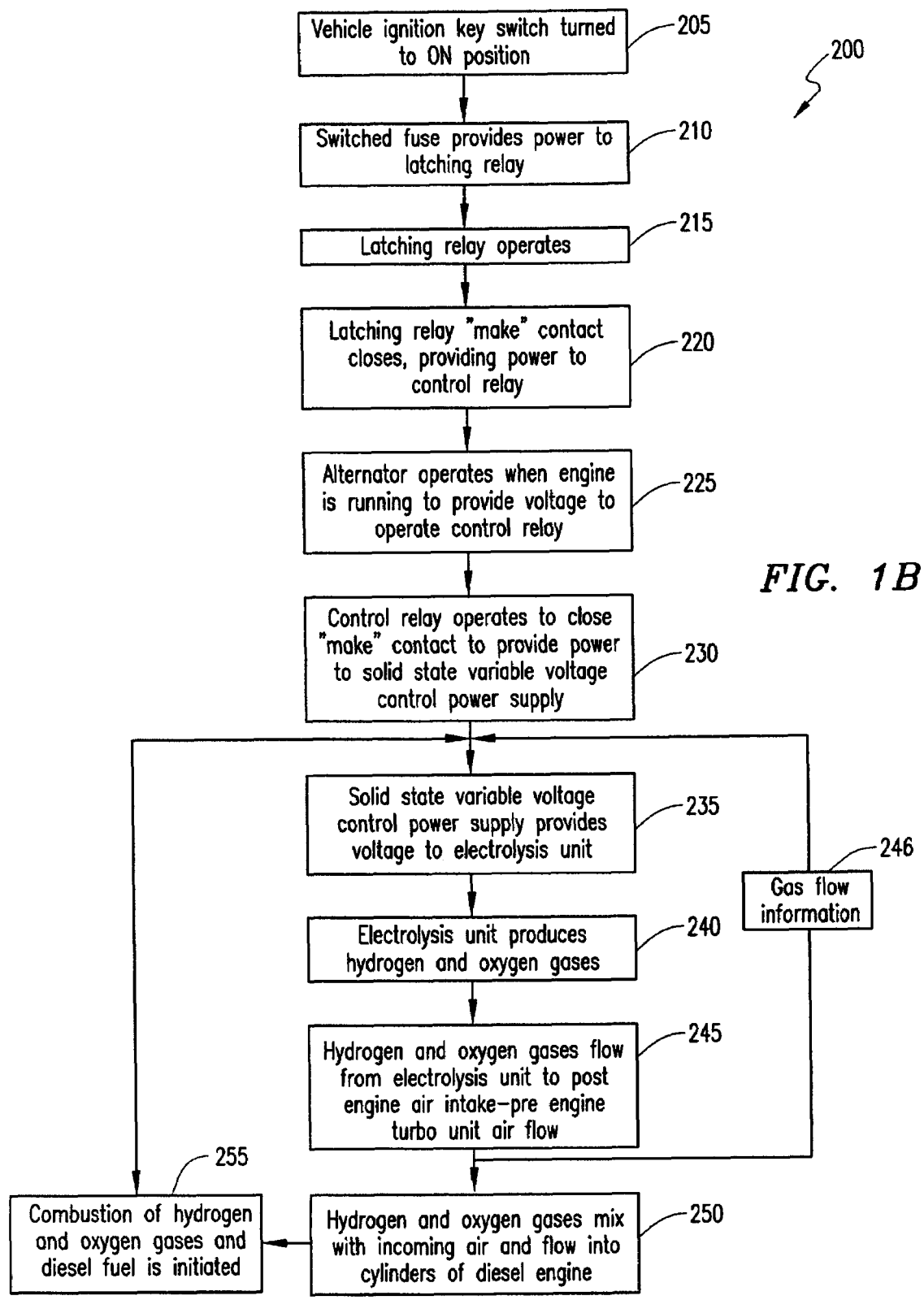
FIG. 1B is a flow chart illustrating an exemplary operation of the operational schematic of FIG. 1A.

Referring now to FIG. 1B, a flow 200 illustrating exemplary operation of the system 100 is shown. The flow 200 begins at step 205. At step 205, the vehicle ignition key switch 150 is turned to an ON position. In step 210, the 2.5 amp switched fuse 151 and blocking diode 153 provides power to the latching relay 155. The 2.5 amp switched fuse 151 may be located, for example, on a vehicle fuse panel. At step 215, the latching relay 155 operates. At step 220, the "make contact" of the latching relay 155 closes, providing power to the control relay 130. At step 225, the alternator 125 engages upon operation of the engine and begins providing voltage to operate the control relay 130. At step 230, the control relay 130 operates to close the "make" contact 143, which in turn closes the circuit that provides power to the solid state variable voltage control power supply 165. At step 235, an output voltage from the solid state variable voltage control power supply is provided to the electrolysis unit 105. In step 240, the electrolysis unit 105 starts producing hydrogen and oxygen gases. In some embodiments, the electrolysis unit 105 starts producing hydrogen and oxygen gases within three seconds of powering on.

Still referring to FIG. 1B, at step 245, the hydrogen and oxygen gases flow from the electrolysis unit 105 via the hose 113 past the solid state variable voltage control power supply 165 and into the post engine air intake-pre engine turbo unit 120 airflow. At step 246, the solid state variable voltage control power supply 165 receives gas flow property information regarding the product gas and performs a feedback control function using the information received and adjusts the voltage supplied to the electrolysis unit 105 as needed. At step 250, the hydrogen and oxygen gases are mixed with the incoming air and flow into the cylinders of the diesel engine during an air intake cycle. At step 255, combustion in the cylinders is initiated and the hydrogen and oxygen gases burn with the diesel fuel. Steps 235-255 are repeated until at least one of "make" contact 140 and "make" contact 143 is opened, such as when the vehicle ignition key switch 150 is turned off, or the alternator 125 is no longer operating. This kill switch function provides a safety aspect for the system.

Because the engine 110 is tied to the vehicle battery 160, if there is a failure to disengage the electrolysis unit 105 from the electrical system, the electrolysis unit 105 could potentially continue to manufacture hydrogen and oxygen gases in a hot, enclosed engine inlet. Various embodiments of the invention are designed to deal with the safety issue associated with the generation of combustible gases. For example, in the embodiment shown in FIG. 1A, the circuit providing power to the electrolysis unit 105 cannot be completed until the make contact switch 143 is closed. In turn, the make contact switch 143 cannot be closed until power is provided by the alternator 125 to the control relay 130, ensuring that the engine is in operation and accepting air flow. Power cannot be supplied to the control relay 130 until the make contact switch 140 is closed. The make contact switch 140 cannot be closed until the latching relay 155 is closed, which is itself powered by ignition of the system 100. This multi-step engagement of the electrical system supplying the electrolysis unit 105 helps to ensure not only that the engine is in full operation before starting the electrolysis unit 105 but also that the electrolysis unit 105 ceases operation when one of the circuits, for whatever reason, is broken.

Additional safety factors may also be designed into various embodiments of the invention. For example, the electrolysis unit 105 may be sized for a particular diesel engine system so that it can provide only the predetermined amount of gases necessary to give an optimal performance enhancement. The size of the electrolysis unit 105 may have a maximum limit of hydrogen and oxygen it can produce at a certain voltage. Other embodiments may contain other features, such as sensors or analyzers, to initiate and cut power to the electrolysis unit 105. Other embodiments may also manipulate physical characteristics such as temperature of the electrolysis unit before and during product gas production.

There are several terms used to describe the operational parameters of a diesel engine. One is by classifying the diesel engine as being a "short stroke" or a "long stroke" engine. By definition, a "short stroke" engine has a bore (i.e., diameter of the cylinder) that is greater than the stroke (i.e., the maximal distance the piston travels within the cylinder in a single direction during operation). A "long stroke" engine has a stroke that is greater in length than the diameter of the bore. Another parameter that can be defined is the "stroke displacement". By definition, the "stroke displacement" is the total sum volume of the working space of all the cylinders together in a diesel engine where fuel and air are mixed.

In generating the data necessary for correlation between a the type of engine, the stroke displacement of the engine, and the size of an electrolysis unit needed to provide a proper amount of hydrogen and oxygen gas, it has been found that measurements of exhaust emissions in conjunction with specific quantities of oxygen and hydrogen injected into the engine will provide improvements in operational parameters of the engine by allowing a mating configuration for the quantity of electrolysis byproducts in conjunction with a given engine type and size. In some embodiments containing a short stroke diesel engine, enhanced performance may be obtained if the engine is fed at about 0.06 L/minute of hydrogen per liter of stroke displacement. In some embodiments of systems containing a long stroke diesel engine, enhanced performance may be obtained if the engine is fed about 0.11 L/minute of hydrogen per liter of stroke displacement. In context of enhancing the performance of either type of engine, it has been found that the hydrogen feed values may vary in a range from the amount given by 10%. For example, a short stroke diesel engine that has 5.9 liters of stroke displacement will typically use about 0.354 L/minute of hydrogen gas.

Figure 1C:
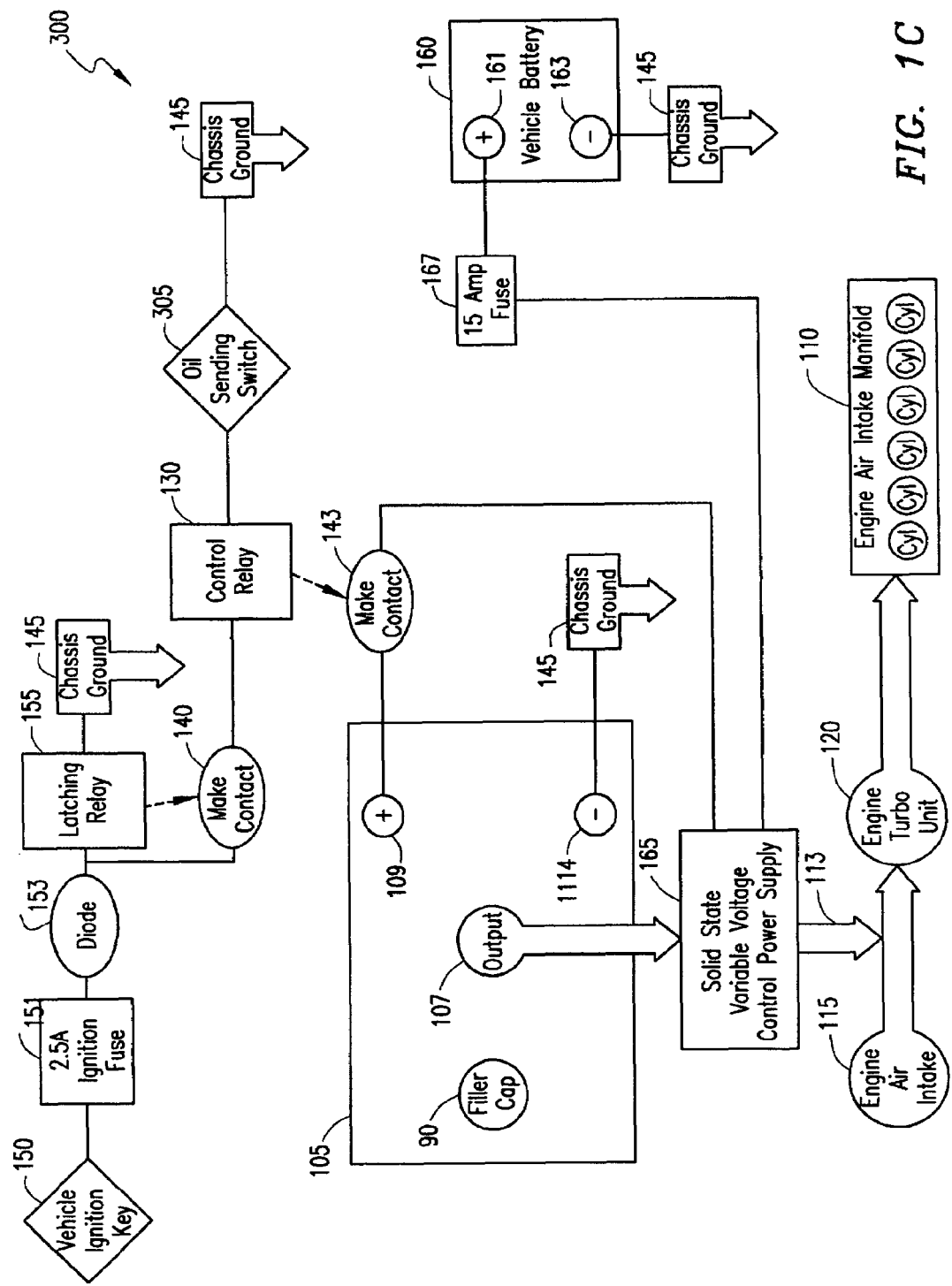
FIG. 1C is a diagrammatic schematic illustrating the operation of an electrolysis unit of FIG. 1 in association with an internal combustion engine.

Referring now to FIG. 1C, there is shown a schematic of a system 300. In FIG. 1C, the use of an alternator 125 to control the make contact switch 143 as illustrated in FIG. 1A has been replaced by an vehicle oil pressure sending switch 305. The vehicle oil pressure sending switch 305 operates when the engine is running and the oil pressure surpasses a pre-set threshold operating pressure value. As a result, the electrolysis unit 105 will not be supplied with power by the solid state variable voltage control power supply 165 until this condition is met. In some embodiments, the oil pressure sending switch 305 may also act as a trip switch in that when the oil operating pressure falls below a pre-set threshold operating pressure value, the circuit is opened (e.g., make contact switch 143) and the product gas production process is halted. In some embodiments, the pressure threshold values for opening and closing the circuit may be different to prevent "chatter", the rapid switching on and off of the circuit when a process oscillates rapidly around a threshold value.

Figure 1D:
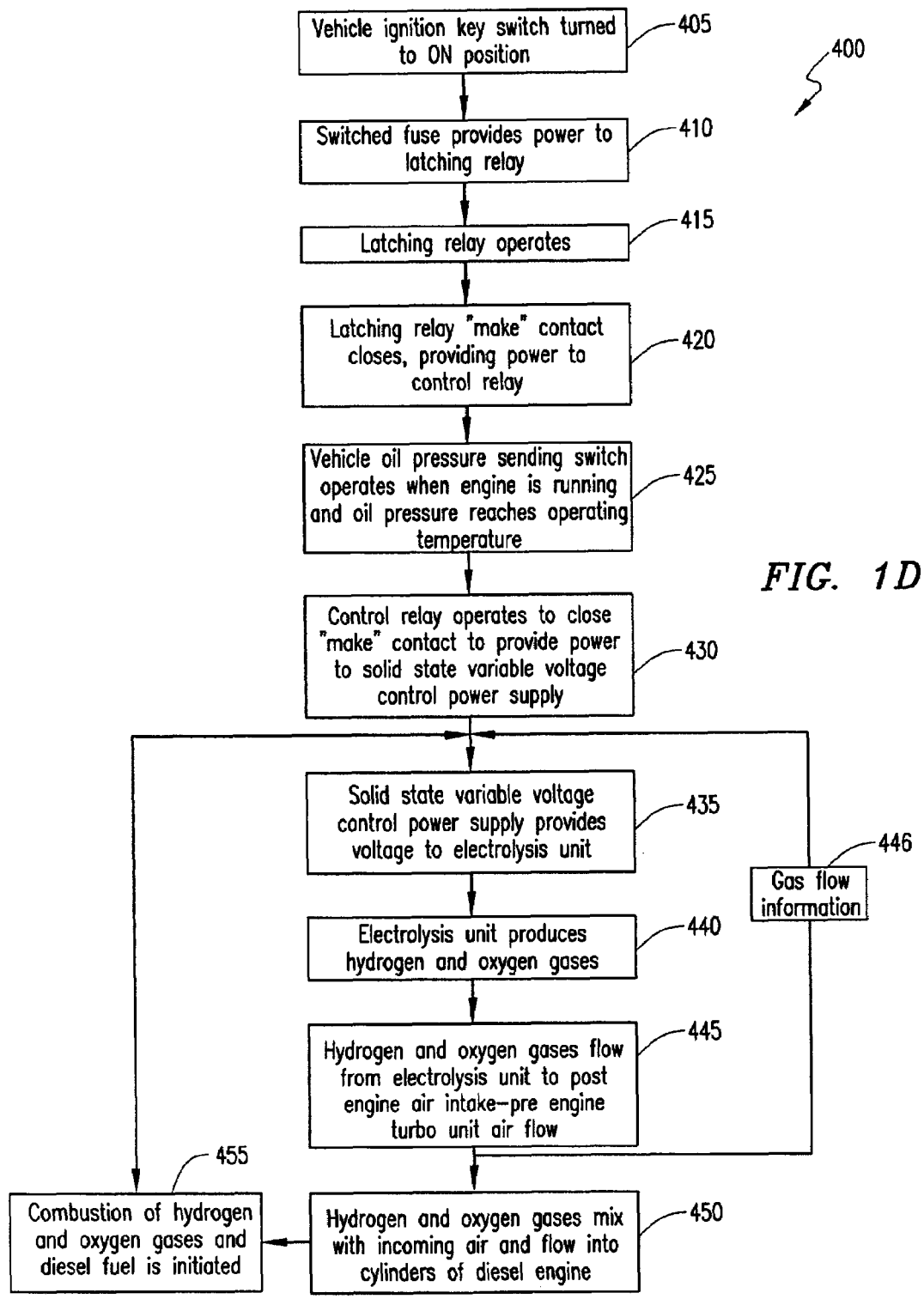
FIG. 1D is a flow chart illustrating an exemplary operation of the operational schematic of FIG. 1C and FIGS. 1E-H illustrate various other embodiments.

Referring now to FIG. 1D, a flow 400 illustrating exemplary operation of the system 300 of FIG. 1C is shown. The flow 400 begins at step 405. In step 405, the vehicle ignition key switch 150 is turned to an ON position. In step 410, the 2.5 amp switched fuse 151 and blocking diode 153 provide power to the latching relay 155. The 2.5 amp switched fuse 151 may be located, for example, on a vehicle fuse panel. At step 415, the latching relay 155 operates and closes. At step 420, the "make contact" of the latching relay 155 closes, providing power to the control relay 130. At step 425, the vehicle oil pressure sending switch 305 operates when the oil pressure reaches an operating pressure threshold, thereby providing voltage to operate the control relay 130. At step 430, the control relay 130 operates to close the make contact 143 switch to provide power to the solid state variable voltage control power supply 165. At step 435, an output of the solid state variable voltage control power supply provides a voltage to the electrolysis unit 105. At step 440, the electrolysis unit 105 starts producing hydrogen and oxygen gases. In another embodiment, the electrolysis unit 105 starts producing hydrogen and oxygen gases within three seconds of powering on.

Still referring to FIG. 1D, at step 445 the hydrogen and oxygen gases flow from the electrolysis unit 105 via the hose 113 past the solid state variable voltage control power supply 165 and into the post engine air intake/pre engine turbo unit 120 airflow. At step 446, the solid state variable voltage control power supply 165 receives gas flow property information regarding the product gas and performs a feedback control function using the information received and adjusts regarding the voltage supplied to the electrolysis unit 105 as needed. At step 450, the hydrogen and oxygen gases are mixed with the incoming air and flow with the engine's intake airflow into the cylinders of the diesel engine during an air intake cycle. At step 455, combustion in the cylinders is initiated and the hydrogen and oxygen gases burn with the diesel fuel causing the diesel fuel to burn more efficiently. Steps 435-455 are repeated until at least one of "make" contact 140 and make contact 143 is opened, such as when the vehicle ignition key switch 150 is turned off, or the vehicle oil pressure falls below the operation threshold pressure. This provides for a safety redundancy system by opening the circuit that provides power to the electrolysis unit 105.

Figure 1E:
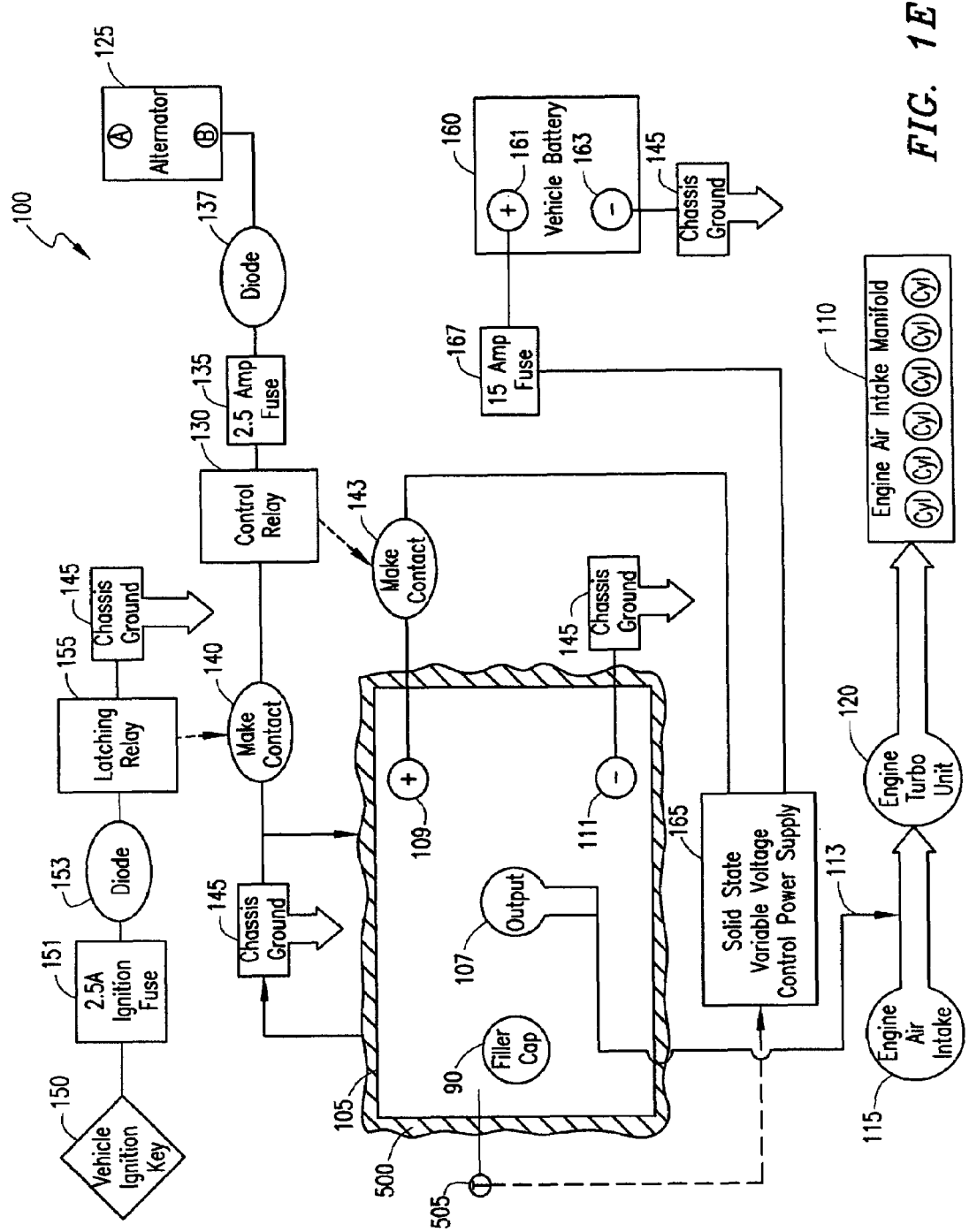

FIGS. 1E-1H illustrate various other embodiments. FIGS. 1E-1H use different means to control and monitor system operation. The embodiment shown in FIG. 1E shows control of the product output of the electrolysis unit 105 by use of controlling temperature, such as by use of an electrically-powered thermal blanket 500. The thermal blanket 500 surrounds and insulates the electrolysis unit 105 from ambient conditions. It is known in the art that control of electrolysis unit temperature is important not only to encourage gas production but to prevent evaporation or freezing of aqueous solution from the electrolysis unit 105. The thermal blanket 500 in some embodiments may be connected to the alternator 145 in so that the thermal blanket 500 does not begin operating until the engine is also operating. In other embodiments, the temperature of the electrolysis unit 105 may be monitored by a temperature gauge 505. In such embodiments, the operating temperature of the electrolysis unit 105 may be used by the solid state variable voltage control power supply 165 to increase or decrease voltage to the electrolysis unit 105 to maintain constant product gas flow based upon electrolysis unit 105 temperature. As the electrolysis unit 105 warms not only through normal hydrolysis operation but by action of the thermal blanket 500, the control power supply 165 may step down voltage to the electrolysis unit 105 to maintain product gas flow at a constant level through a correlation known to occur by temperature of the electrolysis unit 105 at a known feed voltage.

Figure 1F:
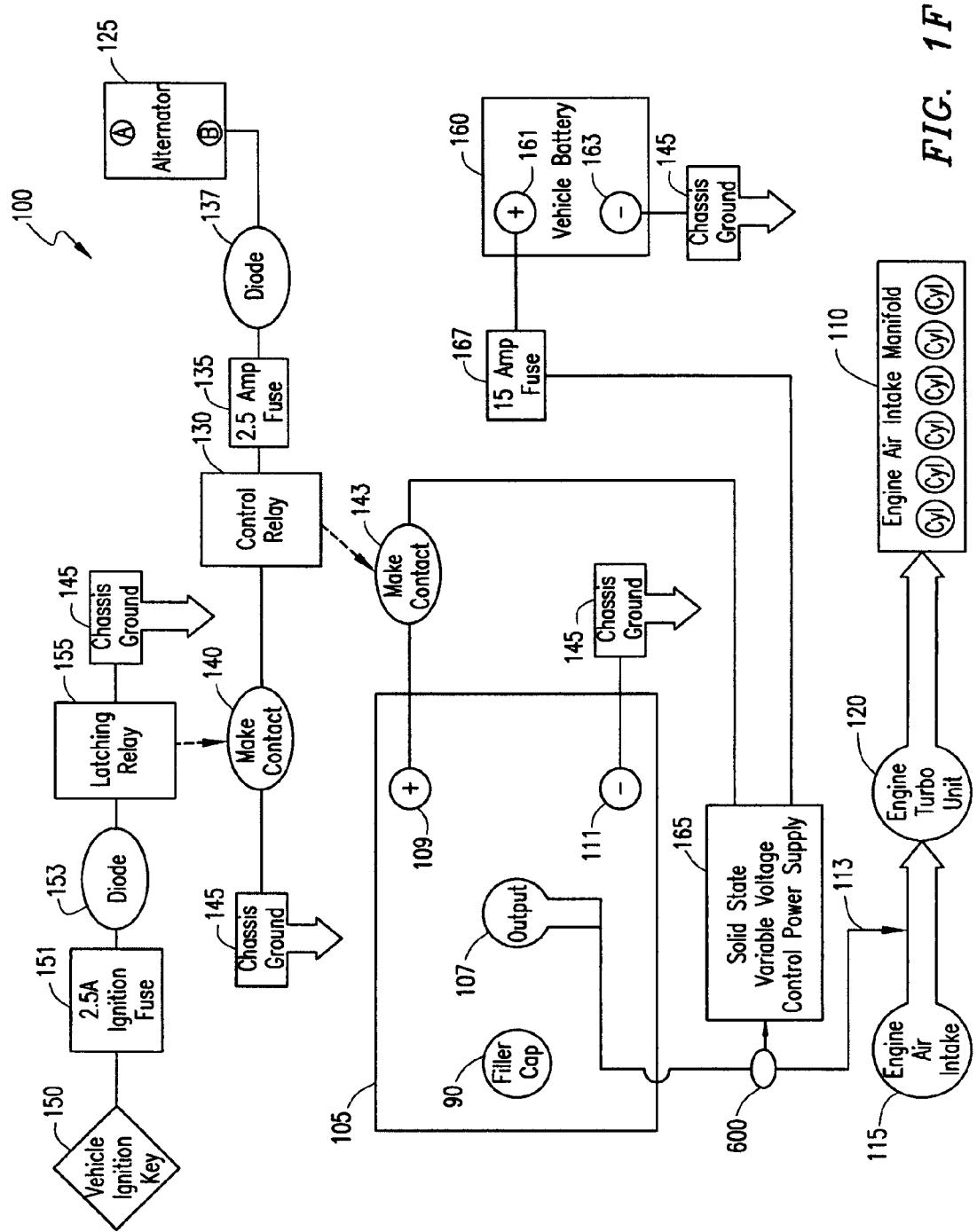

The embodiment shown in FIG. 1F shows control of the product output of the electrolysis unit 105 by use of a product gas sensor, such as a hydrogen or oxygen sensor 600. In such embodiments, the hydrogen or oxygen sensor 600 detects a value for either hydrogen or oxygen and sends the value to the control power supply 165, which correlates a supply voltage to the electrolysis unit 105 in relationship to the presented value.

Figure 1G:
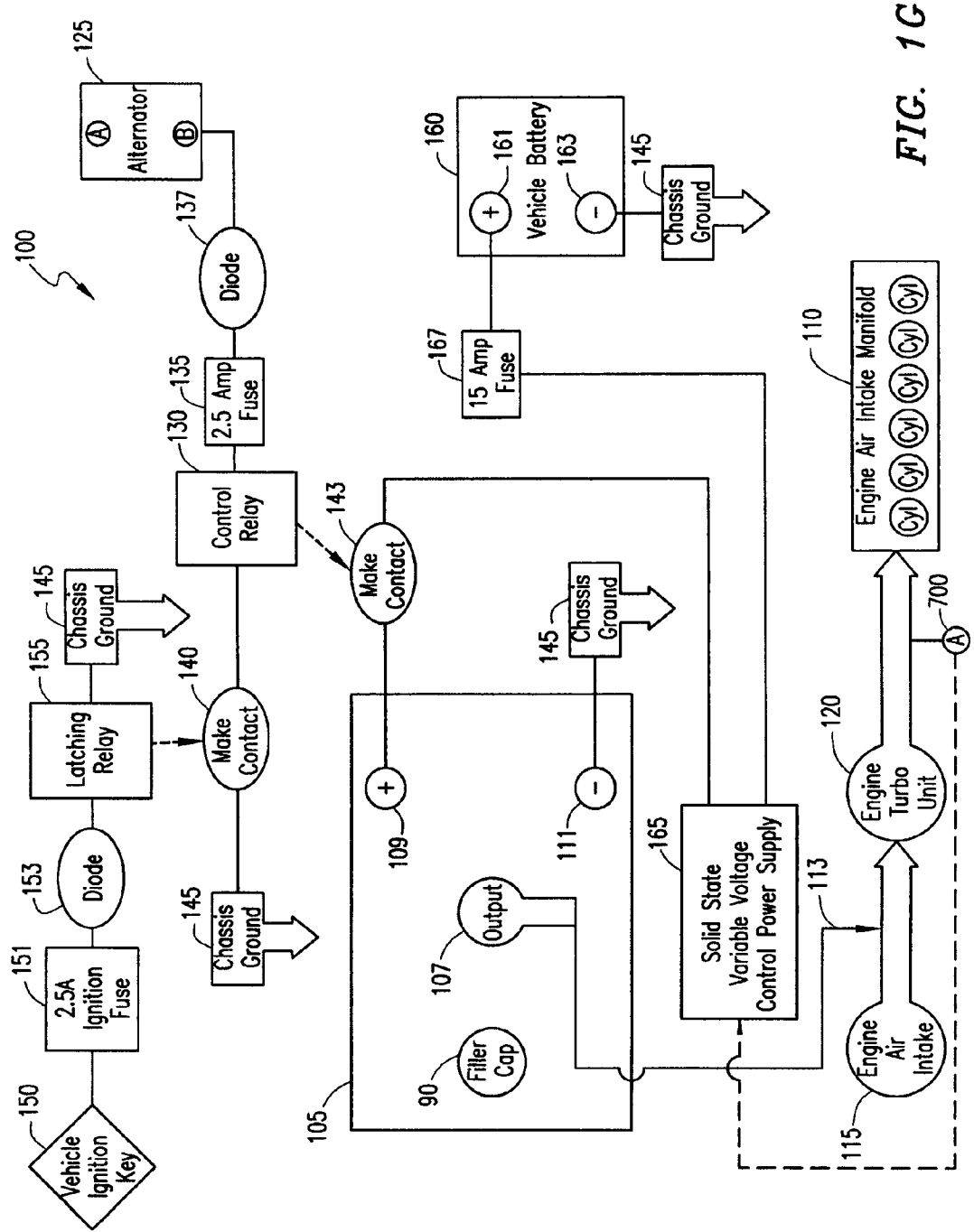

The embodiment shown in FIG. 1G shows control of the product output of the electrolysis unit 105 by use of an on-line gas analyzer 700 on the inlet to the engine air intake manifold 110. In such embodiments, the analyzer 700 may detect the inlet value of total hydrogen or oxygen and send the value to the control power supply 165, which correlates a supply voltage to the electrolysis unit 105 in relationship to the presented value. In other embodiments, the analyzer 700 may be located in the exhaust manifold (not pictured) to detect emission gases, such as unburned hydrocarbons, and send a signal to the control power supply 165.

Figure 1H:
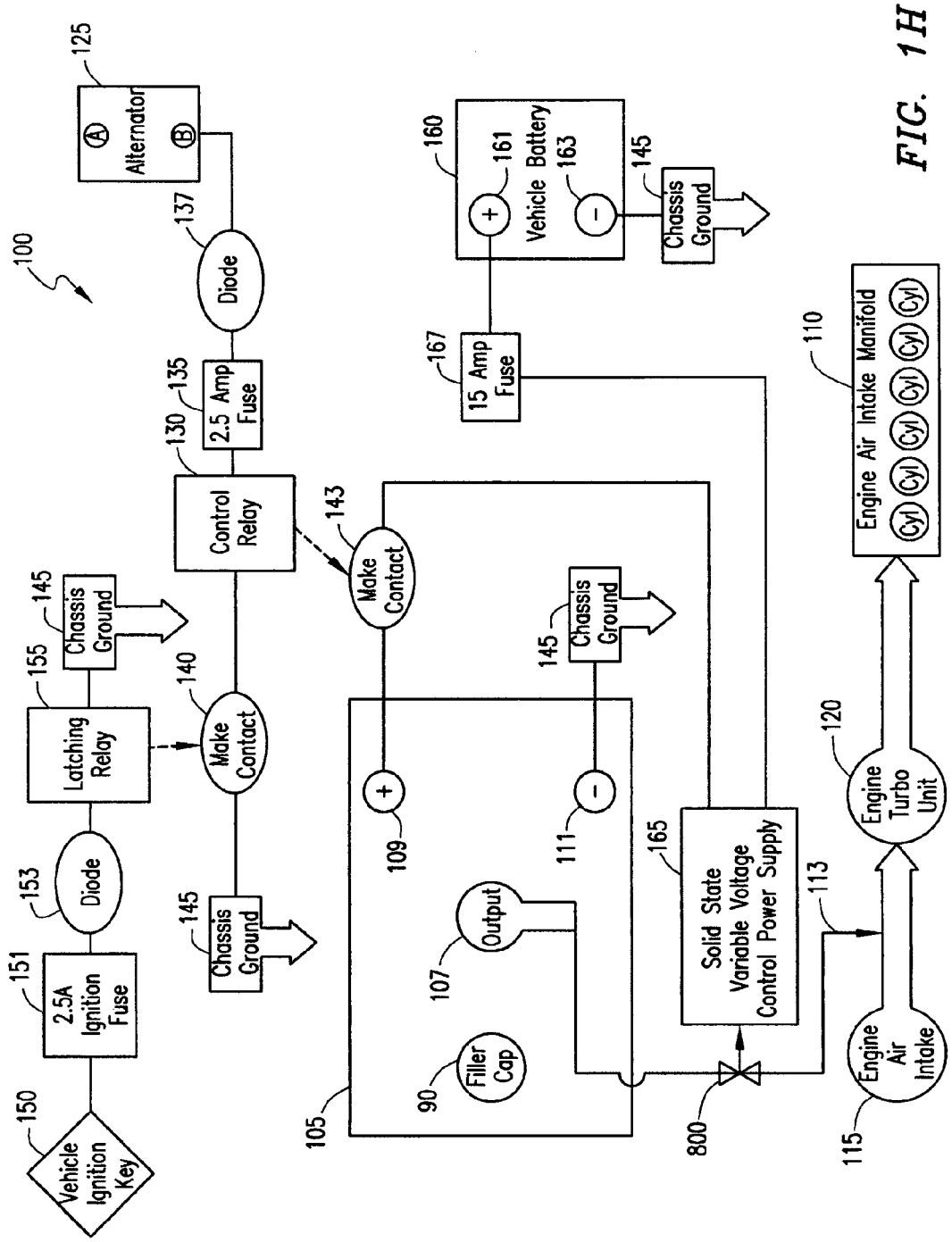

The embodiment shown in FIG. 1H shows control of the product output of the electrolysis unit 105 by use of a product gas flow meter 800, such as a Venturi tube or turbine rotor. In such embodiments, the flow meter 800 detects a value for total gas flow rate from the electrolysis unit 105 and send the value to the control power supply 165, which correlates a supply voltage to the electrolysis unit 105 in relationship to the presented value.

It will be understood by one skilled in the art that there are various ways to effect a control scheme that allows real-time engine performance optimization and improvement of environmental emission attributes. It will also be understood that these ways may be combined with one another without departing from principles of the invention.

Figure 2:
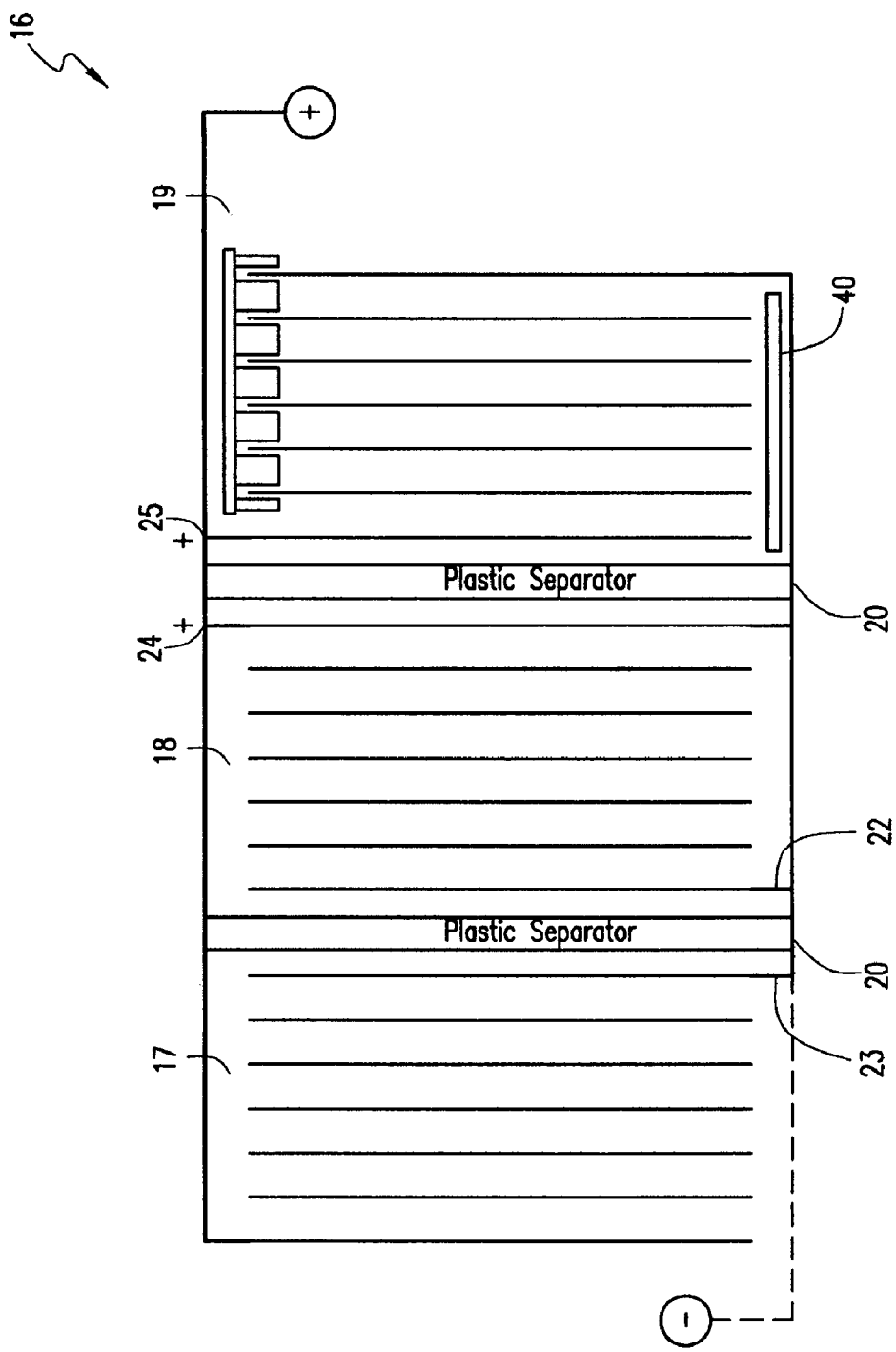
FIG. 2 is an internal line diagram for a three-cell electrolysis unit.

Referring now to FIG. 2, it may be seen that the canister of a three-cell electrolysis unit 10 may be constructed to receive a different number of electrolysis plates in each cell. In one embodiment, an electrolysis unit 105 includes a container 16 that can include any of a first cell 17, a second cell 18 and third cell 19, each of which may include five to nine plates. The first cell 17, the second cell 18, and the third cell 19 are separated from one another by plastic separators 20. Each cell within a given container 16 is wired so as to separate the cells one from another in a reverse polarity configuration. For example, plate 22 of the second cell 18 and plate 23 of the first cell 17 are connected together at the same negative polarity, and plate 24 of the second cell 18 and plate 25 of the third cell 19 are connected together at the same positive polarity. This allows maximum utilization of electrolysis action within a cell and does not result in a disadvantageous electrolysis action between cells in an electrolysis unit 105 as will be defined in more detail.

The size and operational parameters of the electrolysis unit 105 are specified and designed to maintain the temperature of the electrolysis solution within an operational range to prevent evaporation or boiling. It is well known in the art that the electrolytic solution needs to be maintained at a relatively cool temperature to ensure that the electrolysis cells are immersed to an appropriate level so as to permit the proper electrolysis reaction to occur. In a typical embodiment, a set of cooling fins may be utilized to provide for heat removal from the electrolysis unit 105. Other heat sinks or cooling features may be included in the electrolysis unit 105 design.

Still referring to the embodiment in FIG. 2, the polarity of the system is physically provided in a configuration designed to maximize the efficiency of a given cell and does not cause cross determination between adjacent cells relative to the electromagnetic differential between cells. By utilizing a reverse-polarity configuration, it is believed that optimal efficiency is provided in conjunction with the least amount of degradation that could result in an overlap of electrical differential between cells. Adjacent cells typically share a common electrical polarity so there is no electrical differential.

It may further be seen that various embodiments of the invention may be constructed with a configuration maximizing the number of plates exposed to the electrolytic solution. It has been found that an optimum number of plates per cell is most often in the range of five to nine plates. The spacing between plates for this number of plates in a cell may be, for example, about a quarter of an inch. In a typical embodiment, a cell might contain seven plates and be spaced at a distance of a quarter inch apart.

Figure 9A:
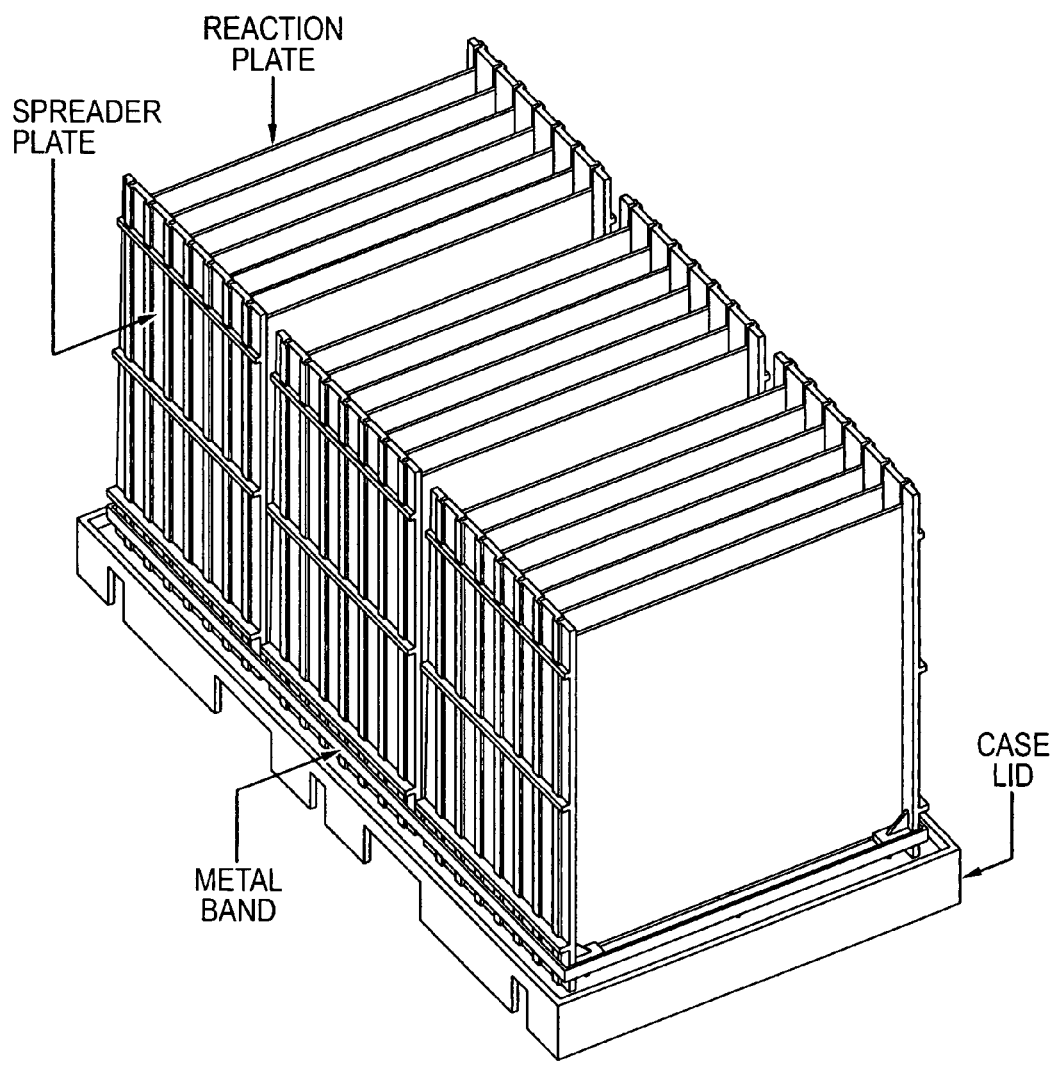
FIGS. 9A-9F illustrate a dielectric mounting configuration for the plates of an electrolysis unit.
Figure 9B:
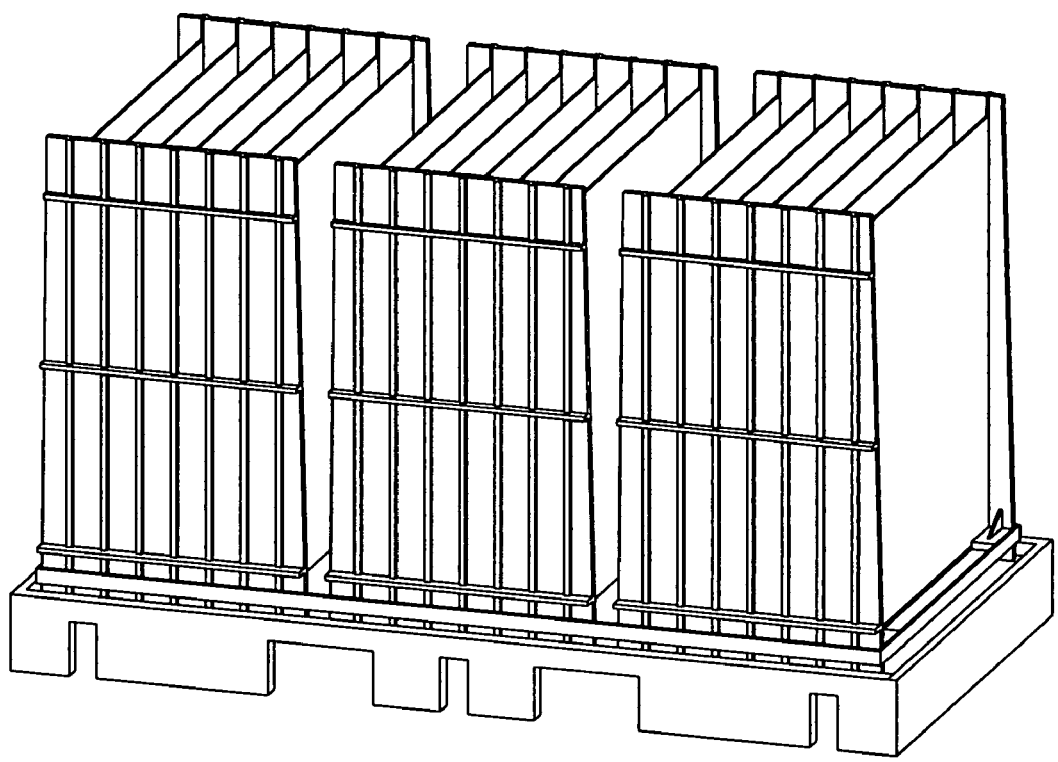
Figure 9C:
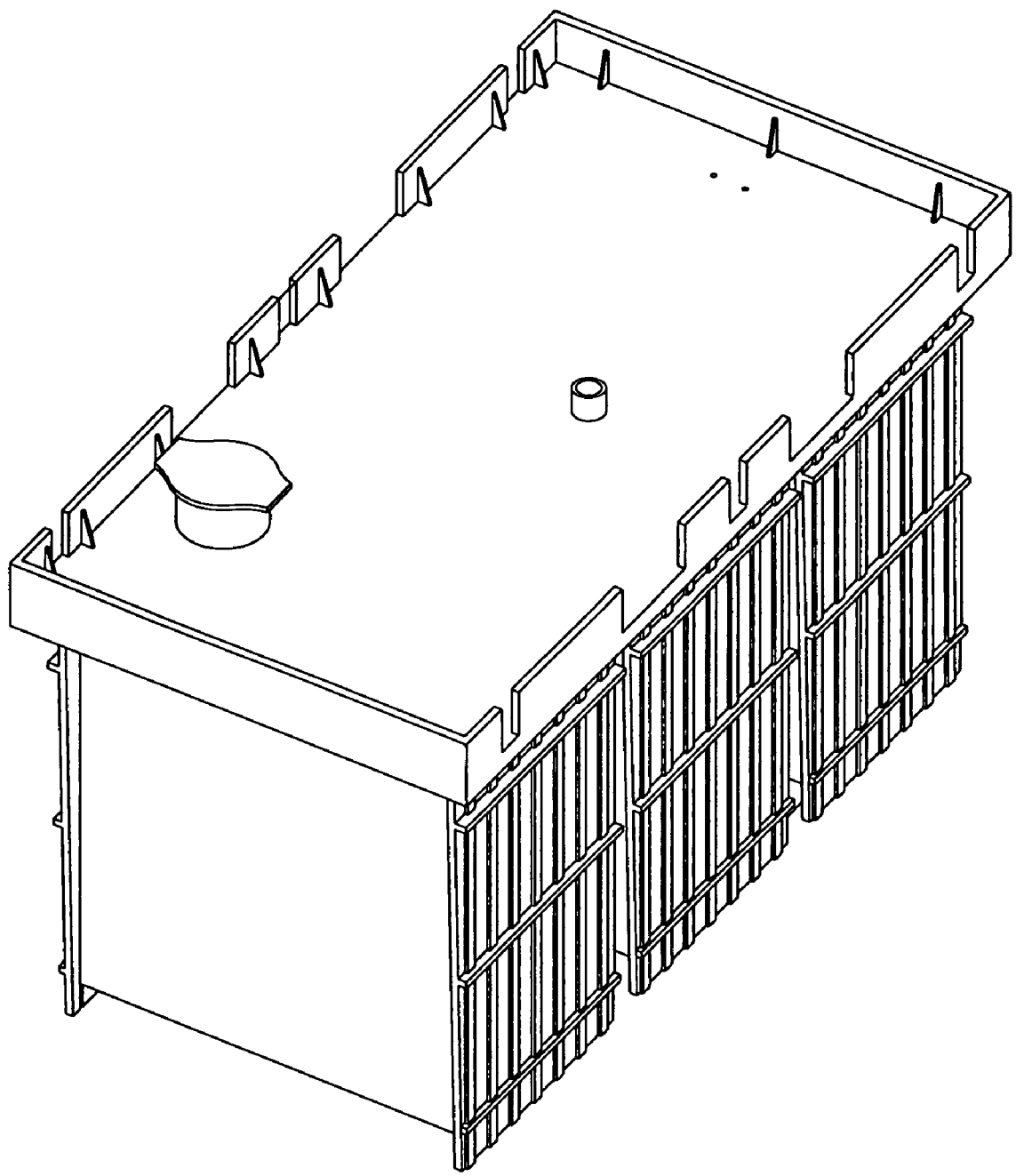
Figure 9D:
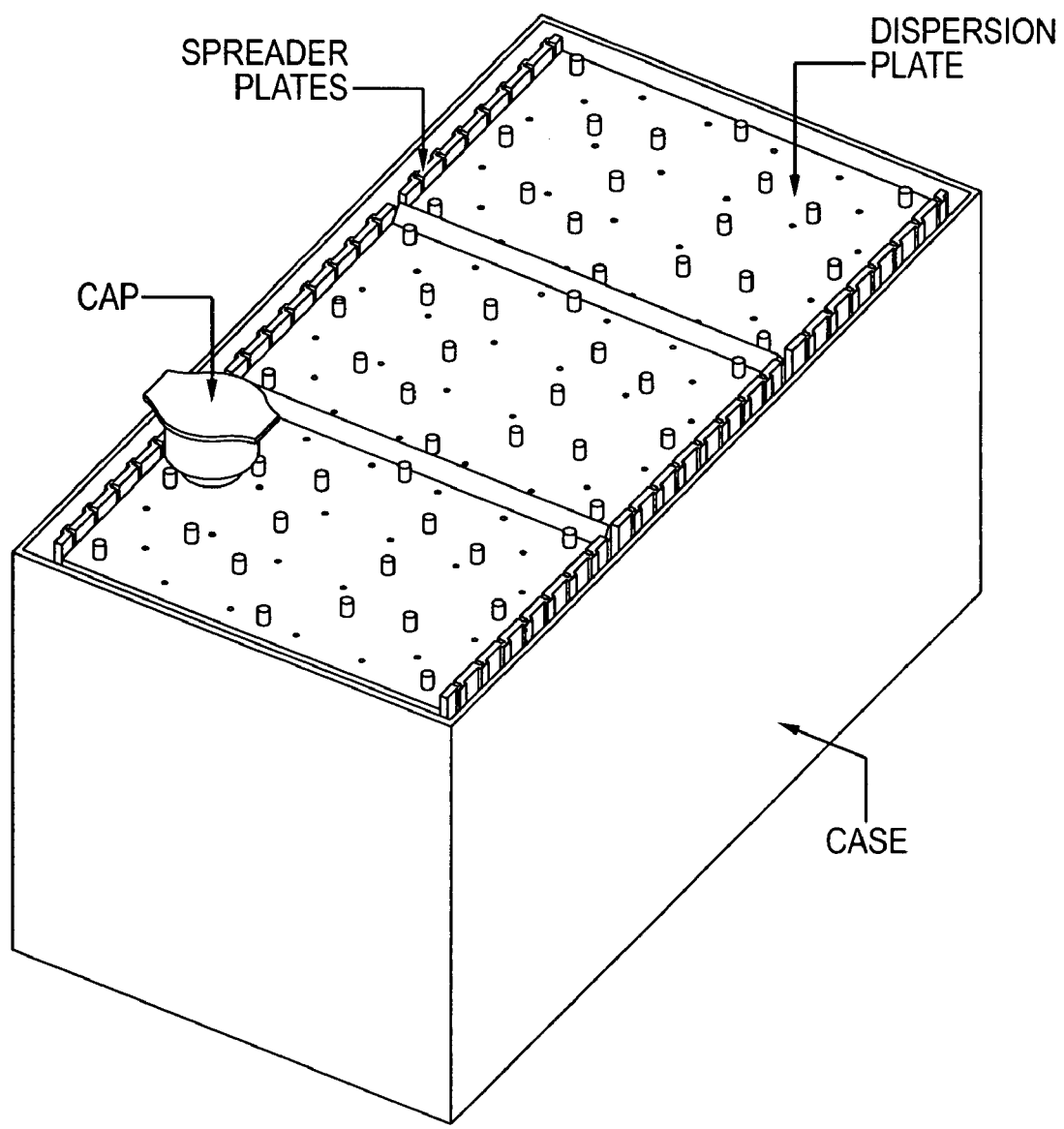
Figure 9E:
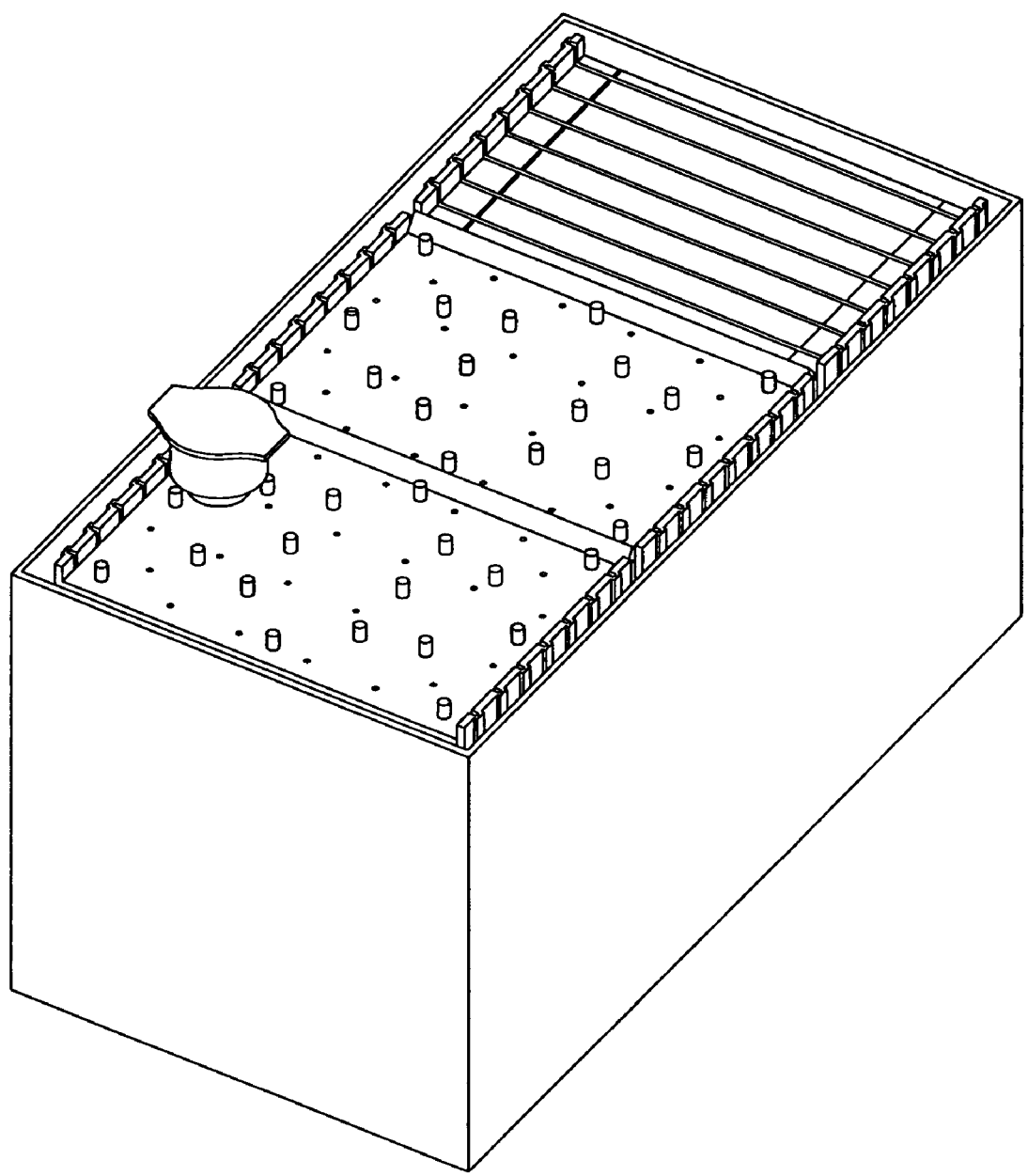
Figure 9F:
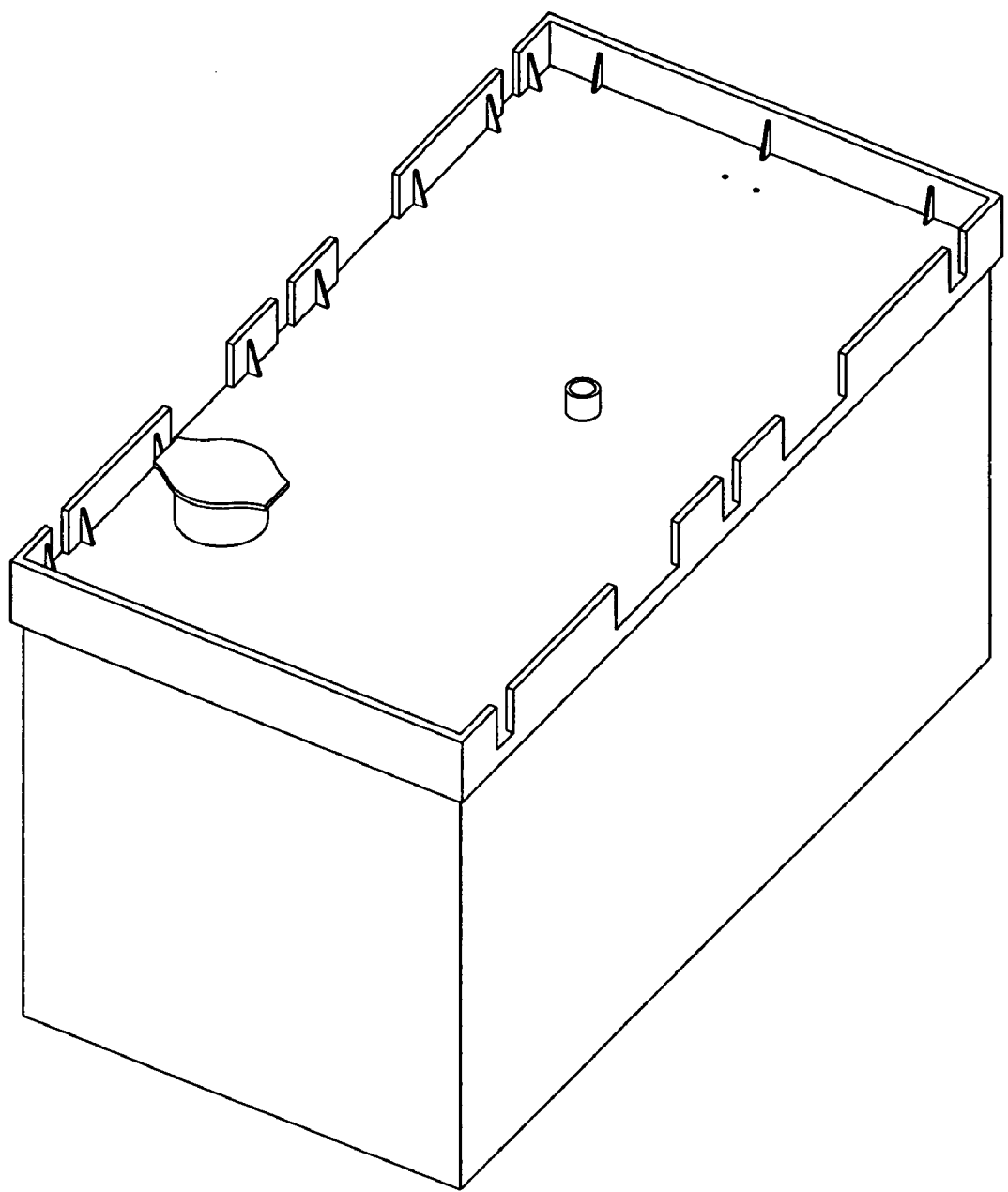

FIGS. 9A-9F illustrate various embodiments of a dielectric mounting configuration for the plates of a electrolysis unit 105. The embodiment in FIG. 9A illustrates a bottom perspective view of the dielectric mounting configuration in which reaction plates are separated from one another by spreader plates. In the mounting configuration of the embodiment in FIG. 9A, three electrolysis cells in an electrolysis unit 105 are shown in which each cell includes seven reaction plates held in separation from one another by two spreader plates. Additionally, a metal band encompasses the three cells, the top of each cell attached to a case lid. FIG. 9B illustrates a side perspective view of the embodied dielectric mounting configuration. FIG. 9C illustrates a top perspective view of the same embodiment showing the mounting configuration in which the spreader plates can be seen. FIG. 9D shows a top perspective view of the embodiment of the mounting configuration in which a case encloses the sides and bottom of the electrolysis cells and the case lid has been removed. FIG. 9D also illustrates a filler cap 90 which allows electrolytic fluid to be added. FIG. 9D additionally illustrates that a dispersion plate is mounted to the top of each cell. FIG. 9E illustrates the mounting configuration of the embodiment showing in FIG. 9D in which one of the dispersion plates has been removed. The embodiment shown in FIG. 9F illustrates a top view of the mounting configuration with the case and case lid shown.

The dielectric mounting allows each plate to be electrically separated from other plates and to maximize efficiency, each plate is of maximum polished surface configuration. The higher the polished configuration of the plate, the less likely the plate is to accumulate deleterious particles, thereby comparatively lasting longer and providing a higher efficiency than plates without a high finish. In some embodiments, the plates will be made from 316 L stainless steel. In some embodiments, a 2B or higher plate finish is used that reduces the surface area of any type of metallic accumulation and improves longevity.

In addition to the plates used in various embodiments of the invention, the electrolytic solution also should be relatively free of impurities. The water used as the aqueous phase of the solution in some embodiments is steam-distilled and reverse-osmosis filtered. The electrolyte may be one of several substances. In some embodiments, an acid is used as the electrolyte. In such embodiments, diluted sulfuric acid may be acid used. In other embodiments, sodium chloride is the electrolyte. In other embodiments, potassium hydroxide is used as the electrolyte. In such embodiments, a solution density of potassium hydroxide in an aqueous phase may be about 11 grams per liter of solution.

Figure 3:
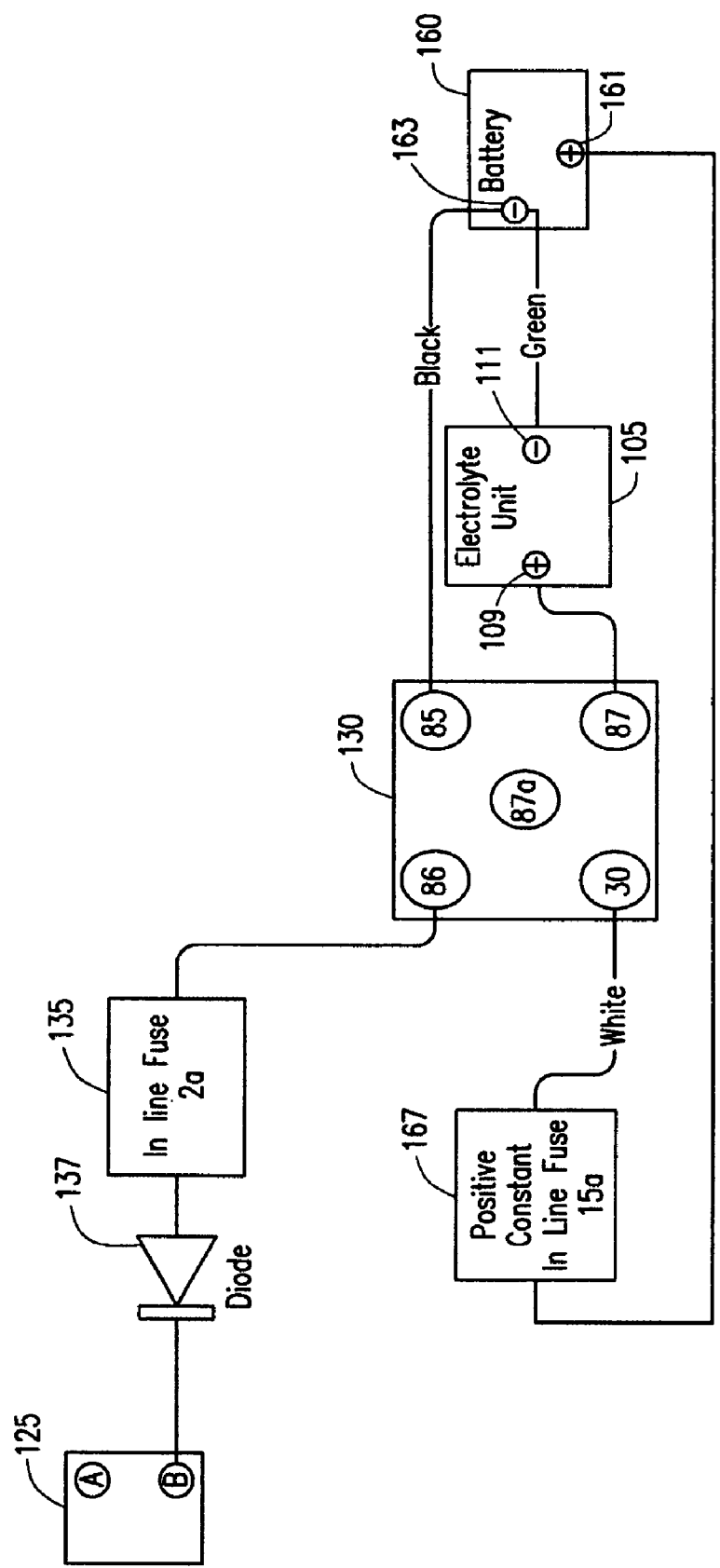
FIG. 3 is a wiring diagram for an electrolysis unit in accordance with the embodiment of FIGS. 1A.

Referring now to FIG. 3, a partial wiring diagram for an electrolysis unit 105 of FIG. 1A is illustrated. The B (positive) side post of the alternator 145 is connected to a terminal 86 of the control relay 130 through a diode 137 and an inline fuse 135. The vehicle battery positive 161 is connected to a terminal 30 of the control relay 130 through the in line fuse 167. A terminal 85 of the control relay 130 is connected to the negative battery terminal 163. A terminal 87 of the control relay 130 is connected to the positive terminal 109 of the electrolysis unit 105. The negative terminal 111 is connected to the negative battery terminal 163.

Figure 4:
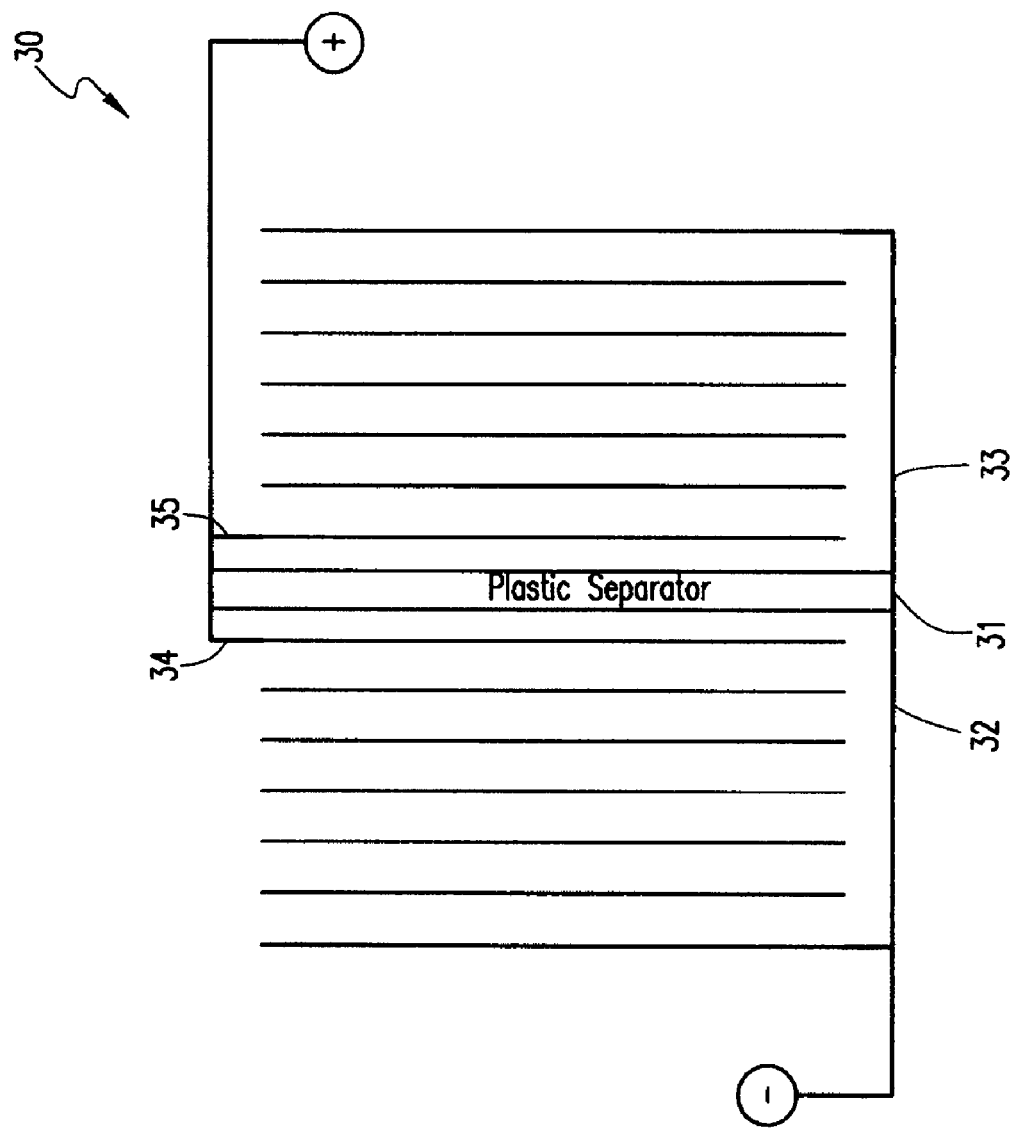
FIG. 4 is an internal line diagram for a two-cell electrolysis unit.

Referring now to FIG. 4, an internal line diagram for a two-cell electrolysis cell unit 12 is shown. The electrolysis unit of the FIG. 4 includes a container 30 that can include any of a first cell 32 and a second cell 33, each of which may include a number of plates, but typically a number in the range of about five to nine plates. The first cell 32 and the second cell 33 are separated from one another by plastic separators 31. The first cell 32 and the second cell 33 are wired so as to separate the cells one from another in a reverse polarity configuration. For example, plate 34 of the first cell 32 and plate 35 of the second cell 33 are connected together at the same positive polarity.

Figure 5:
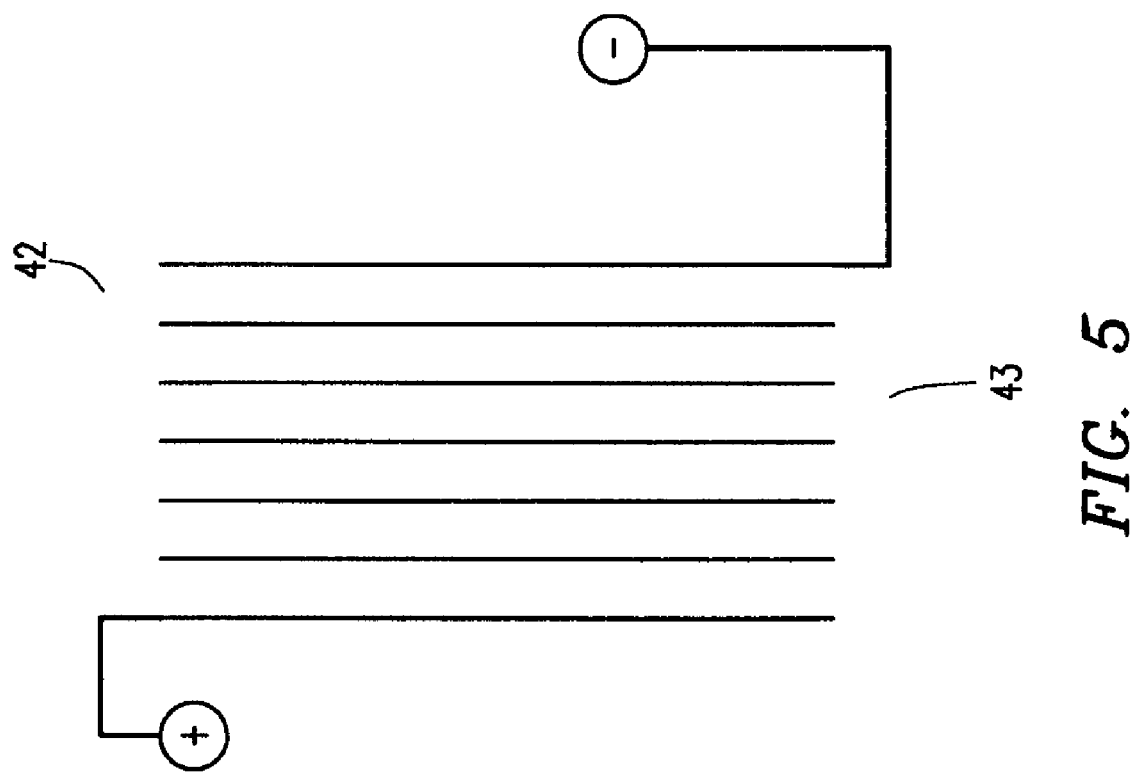
FIG. 5 is an internal line diagram for a single-cell electrolysis unit.

FIG. 5 is an internal line diagram for a single-cell electrolysis unit 14. The electrolysis unit of the FIG. 5 includes a container 42 that includes a single cell 43 which may include a number of plates, but typically a number in a range of about five to nine plates.

Figure 6:
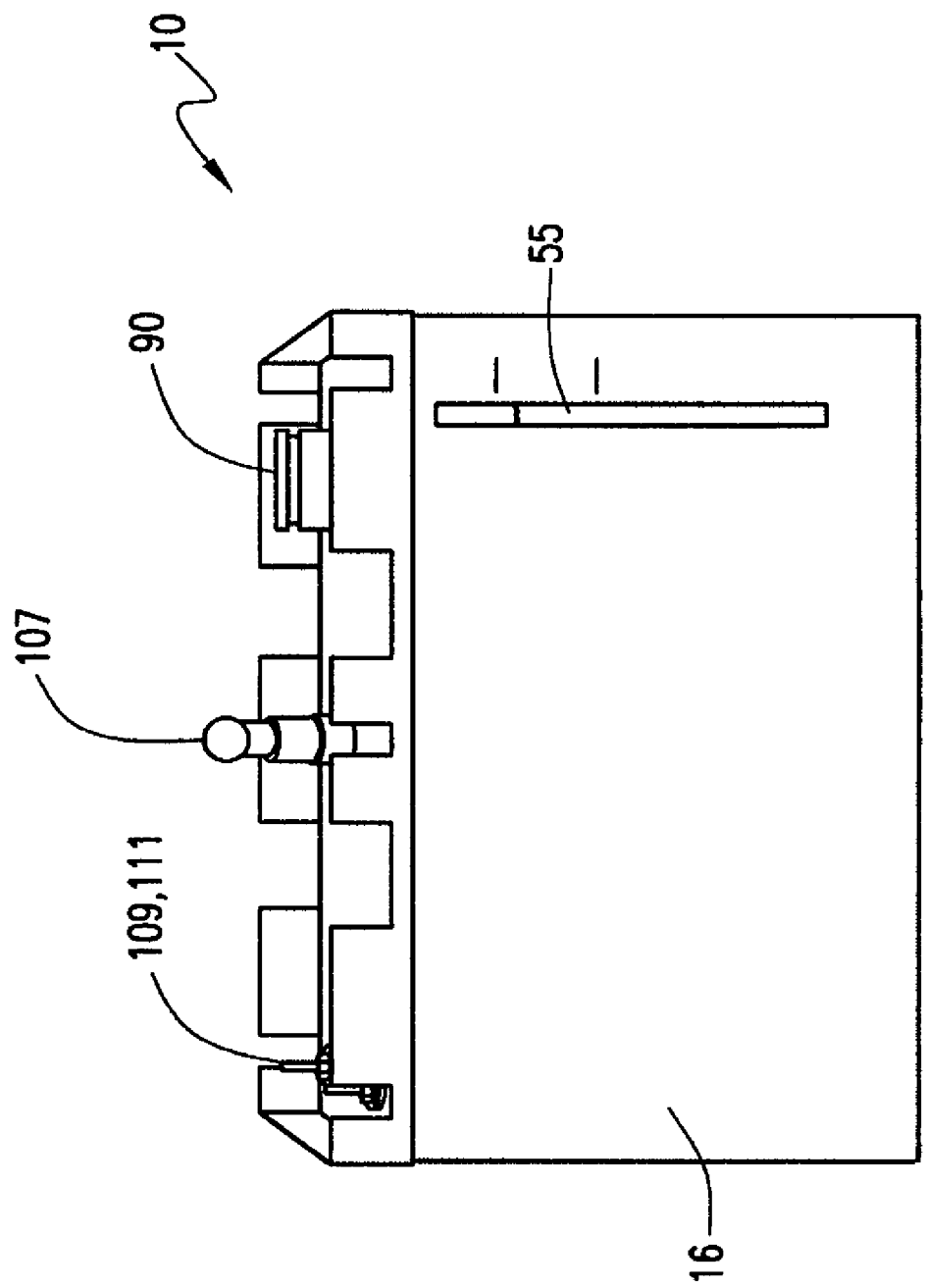
FIG. 6 is an illustration of a three-cell electrolysis unit.

FIG. 6 illustrates a three-cell electrolysis unit 10. The three-cell electrolysis unit 10 may include positive and negative electrical connectors 109 and 111 for receiving a voltage to provide power to the electrolysis unit 10. The electrolysis unit 10 may include an output hose connection 107 for the output of hydrogen and oxygen gases. The electrolysis unit 10 further include a filler cap 90 allowing additional electrolytic fluid to be added to the electrolysis unit 10 in order to maintain the proper level of electrolytic fluid.

Still referring to FIG. 6, a propylene product may be utilized in constructing the electrolysis unit container 16. A translucent region may be formed therein to allow observation of the level of electrolytic fluid, or alternately reducing the wall thickness to provide a means for seeing the level of the electrolyte solution therein may be performed. The electrolysis unit includes a window 55 that provides observation the level of electrolyte solutions, which should not fall below a predetermined solution height based upon the plate configuration of the electrolysis unit 105.

Figure 7:
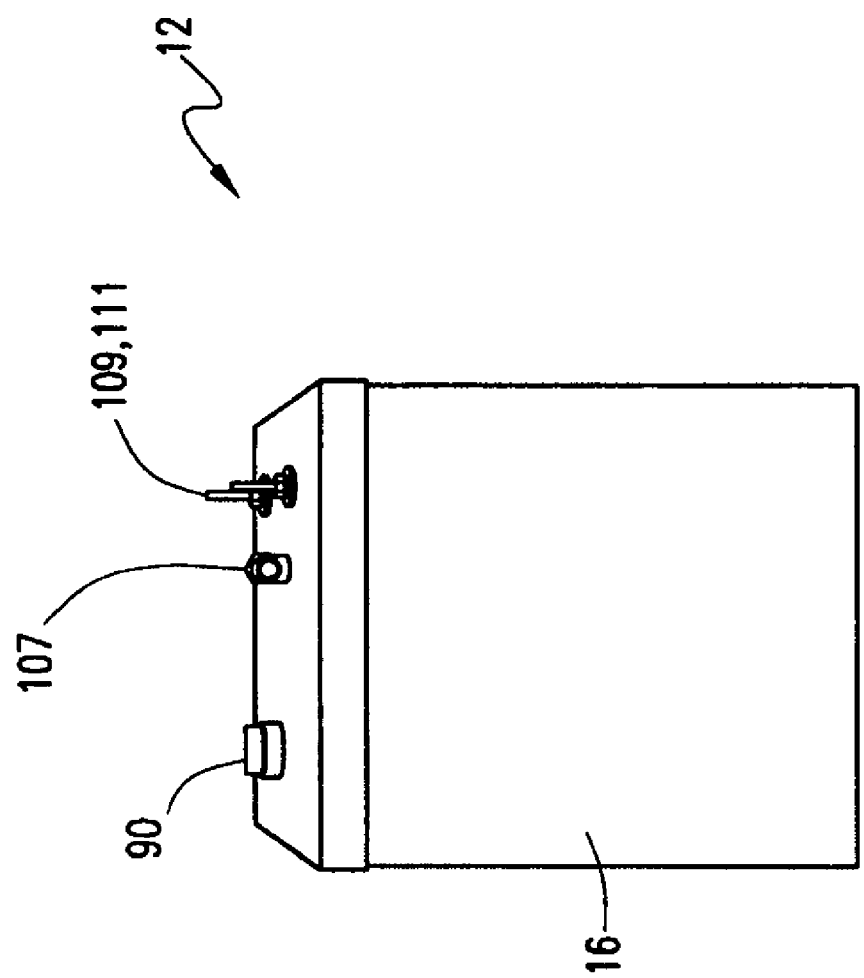
FIG. 7 is an illustration of a two-cell electrolysis unit.

FIG. 7 is a representation of a two-cell electrolysis unit 12. Embodiments of the two cell electrolysis unit 12 may includes positive and negative electrical connectors 109 and 111, an output hose connection 107 for outputting hydrogen and oxygen gases, and a filler cap 90 as described with respect to FIG. 6.

Figure 8:
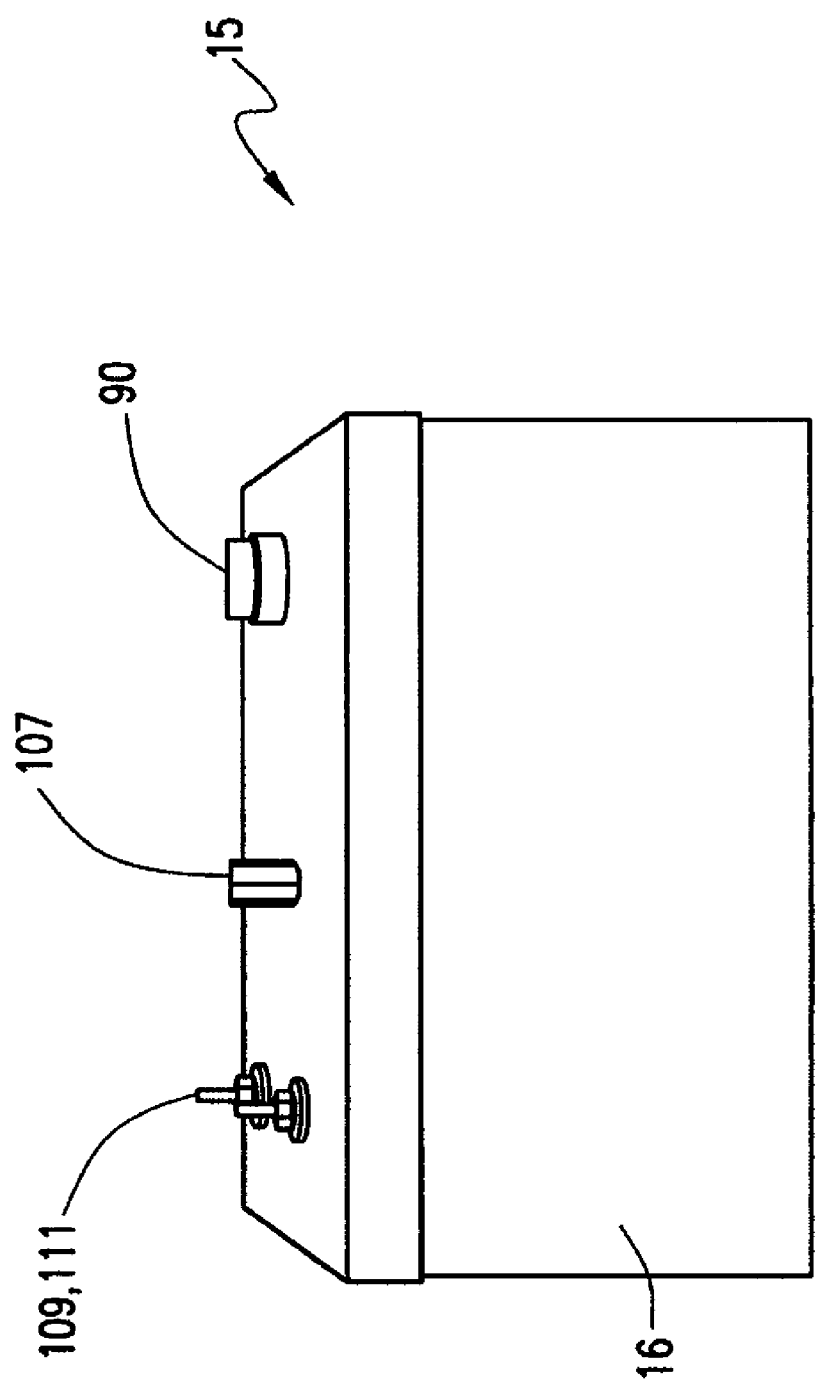
FIG. 8 is an illustration of a half-cell electrolysis unit.

FIG. 8 is a representation of a half-cell electrolysis unit 15. Embodiments of the half-cell cell electrolysis unit 15 may includes positive and negative electrical connectors 109 and 111, an output hose connection 107 for outputting hydrogen and oxygen gases, and a filler cap 90 as described with respect to FIG. 6.

FIG. 6 shows that the electrolysis unit 105 is partially comprised of a polypropylene container 16, similar to that of a battery having baffles dividing the cells. A hole of a quarter to a half-inch in diameter in the baffle allows electrolyte fluid to flow through the electrolysis unit 105 and maintain an equal level in adjacent cells. In embodiments regarding an electrolysis unit 105 with a single cell, the outward cell chambers contain electrolyte fluid in order to maintain a thermal stability of the cell. As previously stated, the operation of the electrolysis unit depends upon exceeding a given temperature threshold. An increase in electrolyte volume does enhance thermal stability.

Construction of the container 16 is achieved, in one embodiment, via a polypropylene heat welder. Those in the art have found welding of a polypropylene lid to a polypropylene housing creates a sealed unit capable of containing the pressures and chemical reactions consistent with the principles of the invention. It may be noted that electrical battery cases are often constructed in a similar manner.

Various embodiments of the invention provide for a self-contained electrolysis unit 105 that an operator can monitor on a routine basis that is sufficiently self-contained and reliable so as to prevent any type of needed maintenance from individuals not familiar with the system. Special instructions may be given to the owner during installation for non-specific types of service, so that the owner does not take it to a service station and have anyone working on it that is unfamiliar. Accordingly, built-in warning labels can be provided indicating for someone to not disconnect the components.

Referring back to FIG. 6, a viewing window 55 of the container 16 allows for the electrolytic liquid level to be observed. The electrolytic solution is partially comprised of steam despoliation, de-ionized, water and forms an aqueous phase that is slightly basic in pH. In some embodiments, potassium hydroxide is added in an amount whereas no further potassium hydroxide needs to be added later in service life. In such embodiments, only water needs to be supplemented to the electrolysis unit 105 to maintain proper operational solution density. In some embodiments, the electrolysis unit 105 is sized for a pre-determined level of product hydrogen and oxygen output from the cell that is in correlation to the metrics of the diesel engine given a fixed electrolytic solution density, cell arrangement, and number of plates. The connectivity arrangement in accordance with the at least one embodiment includes a connection to an alternator 125 that allows a solenoid 130 to engage and disengage the electrolysis unit 105 from the electrical system to initiate and deactivate the hydrolysis reaction.

In accordance with principles of the invention, the power to the electrolysis unit may be regulated depending upon the voltage output necessary and in direct correlation with a pre-existing program for when the power is decreased which will eventually occur after the temperature and the solution has increased to a point where maximum output is provided. The output then flows into the diesel engine through a connection at the air intake to the engine. This allow for embodiments of the system to increase engine performance with a variable voltage input scenario at a relatively constant level electrolyte solution wherein the temperature of the solution is maintained at level low enough to prevent vaporization. The increased performance of a diesel engine may be provided by the injection of a relatively substantially controlled volume of hydrogen and oxygen produced within the vicinity of the engine for the purpose of minimization of various negative fuel combustion by-products typical of diesel engines.

The introduction of the hydrogen and oxygen gases in the combustion chamber causes the fuel in the combustion chamber to burn more cleanly, producing less carbon deposits within the engine, the injectors, the heads, and the valves as well as producing less carbon in the oil which gives your oil longer engine life because there is less carbon in the oil. This further results in less friction wear on the mechanical parts so that there is less trace minerals in the engine oil thereby contributing to less wear on the engine.

In various embodiments, the pyrometer temperature (i.e., the measure of how hot the gas in the exhaust stack is) has been shown to decrease relative to a non-supplemented diesel engine by a range of about 50-150° F. In a typical diesel engine, most of the heat in the exhaust track is raw diesel fuel still burning in the exhaust pipe. When the exhaust valve opens, because there is not complete combustion in the engine cylinder, the diesel fuel that is still burning exits out the exhaust stack. Unburned raw hydrocarbon that is in the exhaust stack is one of the contributors to soot out the exhaust.

Various embodiments of the invention provide for cooler exhaust temperatures because the amount of unburned fuel in the exhaust track is reduced. The cooler exhaust temperatures provided by typical embodiments of the invention give longer life to the exhaust manifold. In many markets, for example, desert markets, exhaust gases are what powers turbines, so the decrease in exhaust temperatures provides an increase in exhaust manifold and turbine life.

Although various embodiments of the method and apparatus of the invention have been illustrated in the accompanying Drawings and described in the foregoing Detailed Description, it will be understood that the invention is not limited to the embodiments disclosed, but is capable of numerous rearrangements, modifications and substitutions without departing from the spirit of the invention as set forth herein.

What is claimed is:

1. A system comprising:
    an electrolysis unit capable of producing hydrogen gas and oxygen gas and interoperably connected to a diesel engine;
    wherein an amount of hydrogen gas and oxygen gas produced by the electrolysis unit is proportionally correlated to a fixed stroke type and stroke displacement;
    a power supply system interoperably connected to the electrolysis unit and comprising a variable voltage control unit regulating the amount of power to the electrolysis unit; wherein when power being supplied by the power supply system is increased an amount of hydrogen gas and oxygen gas supplied to the diesel engine increases; and
    a safety mechanism interoperably connected to the power supply system to terminate power to the electrolysis unit responsive to cessation of operation of the diesel engine.

2. The system of claim 1, wherein the amount of power supplied to the electrolysis unit is based upon a temperature of the electrolysis unit.

3. The system of claim 1, wherein the amount of power supplied to the electrolysis unit is dependent upon a concentration of hydrogen gas in the hydrogen gas and oxygen gas produced.

4. The system of claim 1, wherein the amount of power supplied to the electrolysis unit is dependent upon a concentration of oxygen gas in the hydrogen gas and oxygen gas produced.

5. The system of claim 1, wherein the amount of power supplied to the electrolysis unit is dependent upon a concentration of gases in an air intake of the diesel engine.

6. The system of claim 1, wherein the amount of power supplied to the electrolysis unit is dependent upon a concentration of hydrocarbons in an exhaust system of the diesel engine.

7. The system of claim 1, wherein the amount of power supplied to the electrolysis unit is dependent upon a flow volume of the hydrogen and oxygen gases from the electrolysis unit to an air intake of the diesel engine.

8. The system of claim 1, wherein the amount of hydrogen and oxygen produced is proportionally correlated to the fixed stroke type and stroke displacement, wherein the engine is a short stroke engine and the amount of hydrogen produced is about 0.06 liters of hydrogen gas per minute per liter of stroke displacement.

9. The system of claim 1, wherein the amount of hydrogen and oxygen produced is proportionally correlated to the fixed stroke type and stroke displacement, wherein the engine is a long stroke engine and the amount of hydrogen produced is about 0.11 liters of hydrogen gas per liter of stroke displacement.

10. The system of claim 1, wherein the safety mechanism comprises a solenoid switch.

11. The system of claim 10, wherein a position of the solenoid switch is controlled by an oil pressure sensor.

12. The system of claim 10, wherein a position of the solenoid switch is controlled by an ignition circuit.

13. The system of claim 10, wherein a position of the solenoid switch is controlled by an alternator circuit.

14. A method comprising:
providing power to an electrolysis unit;
wherein the power provided is proportional to an amount of hydrogen gas and oxygen gas to be produced by the electrolysis unit;
producing, by the electrolysis unit, hydrogen gas and oxygen gas;
transmitting at least some of the produced hydrogen gas and oxygen gas to a diesel engine;
obtaining information regarding the transmitted hydrogen gas and oxygen gas; and
determining, based on the obtained information, whether the amount of power provided to the electrolysis unit should be adjusted.

15. The method of claim 14, further comprising the step of adjusting the amount of power provided to the electrolysis unit.

16. The method of claim 14, wherein the amount of hydrogen gas produced in the producing step is about 0.06 liters of hydrogen gas per minute per liter of stroke displacement for a short stroke engine.

17. The method of claim 14, wherein the amount of hydrogen gas produced in the producing step is about 0.11 liters of hydrogen gas per liter of stroke displacement for a long stroke engine.

18. The method of claim 14, further comprising the step of terminating power to the electrolysis unit responsive to cessation of operation of the diesel engine.

19. The method of claim 18, wherein the step of terminating power comprises removing power to the electrolysis unit via a solenoid switch.

20. The method of claim 19, wherein the solenoid switch actuates responsive to information received from an oil pressure sensor.

21. The method of claim 19, wherein the solenoid switch actuates responsive to information received from an ignition circuit.

22. The method of claim 19, wherein the solenoid switch actuates responsive to information received from an alternator circuit.

* * * * *